United States Patent
Li et al.

(10) Patent No.: US 11,483,850 B2
(45) Date of Patent: Oct. 25, 2022

(54) UPLINK INFORMATION TRANSMISSION METHOD AND APPARATUS

(71) Applicant: Huawei Technologies Co., Ltd., Shenzhen (CN)

(72) Inventors: Shengyu Li, Shenzhen (CN); Jiafeng Shao, Beijing (CN); Yongxia Lyu, Ottawa (CA); Dan Hu, Beijing (CN); Xiuqiang Xu, Shanghai (CN); Yan Chen, Shanghai (CN); Yi Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 77 days.

(21) Appl. No.: 16/925,931

(22) Filed: Jul. 10, 2020

(65) Prior Publication Data
US 2020/0344781 A1 Oct. 29, 2020

Related U.S. Application Data

(63) Continuation of application No. PCT/CN2019/071328, filed on Jan. 11, 2019.

(30) Foreign Application Priority Data

Jan. 12, 2018 (CN) .......................... 201810032720.4
Feb. 14, 2018 (CN) .......................... 201810152085.3

(51) Int. Cl.
*H04W 4/00* (2018.01)
*H04W 72/12* (2009.01)
(Continued)

(52) U.S. Cl.
CPC ....... *H04W 72/1268* (2013.01); *H04L 1/1819* (2013.01); *H04L 5/0044* (2013.01); *H04W 72/042* (2013.01); *H04W 72/0413* (2013.01)

(58) Field of Classification Search
CPC ... H04L 5/0053; H04L 5/0055; H04L 5/0057; H04L 5/0094
See application file for complete search history.

(56) References Cited

U.S. PATENT DOCUMENTS 9,397,796 B2 7/2016 Papasakellariou
2016/0094996 A1 3/2016 Gang et al.
(Continued)

FOREIGN PATENT DOCUMENTS

CN 102301792 A 12/2011
CN 102377537 A 3/2012
(Continued)

OTHER PUBLICATIONS

3rd Generation Partnership Project; Technical Specification Group Radio Access Network; NR; Multiplexing and channel coding (Release 15), 3GPP TS 38.212 V15.0.0 (Dec. 2017), 82 pages.
(Continued)

*Primary Examiner* — Bo Hui A Zhu
(74) *Attorney, Agent, or Firm* — Slater Matsil, LLP

(57) ABSTRACT

An uplink information transmission method and apparatus are disclosed. The uplink information transmission method includes: receiving, by a terminal device, downlink control information DCI sent by a network device, and determining, based on the DCI, a transmission resource of a physical uplink shared channel PUSCH scheduled by using the DCI, where the transmission resource of the PUSCH overlaps a transmission resource of a physical uplink control channel PUCCH in time domain, and the PUCCH is used to carry to-be-transmitted uplink control information UCI; and when a first condition is met, sending, by the terminal device, uplink data on the PUSCH, and skipping sending the UCI on the PUSCH.

12 Claims, 8 Drawing Sheets

(51) Int. Cl.
  *H04L 1/18* (2006.01)
  *H04L 5/00* (2006.01)
  *H04W 72/04* (2009.01)

(56) References Cited

U.S. PATENT DOCUMENTS

| | | | |
|---|---|---|---|
| 2018/0006790 A1 | 1/2018 | Park et al. | |
| 2019/0007942 A1* | 1/2019 | Takeda | H04W 72/0413 |
| 2019/0223205 A1* | 7/2019 | Papasakellariou | H04L 5/00 |
| 2020/0288458 A1* | 9/2020 | Takeda | H04W 72/0413 |
| 2020/0374917 A1* | 11/2020 | Takeda | H04L 5/0044 |
| 2021/0067275 A1* | 3/2021 | Takeda | H04L 1/1861 |

FOREIGN PATENT DOCUMENTS

| | | |
|---|---|---|
| CN | 103209483 A | 7/2013 |
| CN | 103686858 A | 3/2014 |
| CN | 105721133 A | 6/2016 |
| CN | 106211345 A | 12/2016 |
| CN | 107210889 A | 9/2017 |
| EP | 2385736 A1 | 11/2011 |
| WO | 2015017373 A1 | 2/2015 |
| WO | 2017078147 A1 | 5/2017 |
| WO | 2017099556 A1 | 6/2017 |

OTHER PUBLICATIONS

3rd Generation Partnership Project; Technical Specification Group Radio Access Network; NR; Physical layer procedures for data (Release 15), 3GPP TS 38.214 V15.0.0 (Dec. 2017), 71 pages.

Huawei et al., "Discussion on UCI feedback for URLLC", 3GPP TSG RAN WG1 Meeting#91, R1-1719413, Reno, NV, US, Nov. 27-Dec. 1, 2017, 6 pages.

* cited by examiner

UPLINK INFORMATION TRANSMISSION METHOD AND APPARATUS

CROSS-REFERENCE TO RELATED APPLICATIONS

This application is a continuation of International Application No. PCT/CN2019/071328, filed on Jan. 11, 2019, which claims priority to Chinese Patent Application No. 201810032720.4, filed on Jan. 12, 2018, and Chinese Patent Application No. 201810152085.3, filed on Feb. 14, 2018. All of the aforementioned patent applications are hereby incorporated by reference in their entireties.

TECHNICAL FIELD

This application relates to the field of wireless communications, and in particular, to an uplink information transmission method and apparatus.

BACKGROUND

Simultaneous transmission of a physical uplink control channel (PUCCH) and a physical uplink shared channel (PUSCH) is supported in long term evolution (LTE). However, to reduce a peak to average power ratio (PAPR), and reduce impact of inter-modulation distortion (IMD), uplink control information (UCI) to be carried on the PUCCH is usually piggybacked on the PUSCH. This UCI transmission manner is also referred to as UCI being piggybacked on a PUSCH. In addition, it is considered that importance of the UCI is greater than that of uplink data carried on the PUSCH. Therefore, a modulation and coding scheme (MCS) offset value of the UCI is set to be greater than or equal to 1.

However, when the UCI is piggybacked on the PUSCH, the UCI occupies a part of a resource originally used to carry the uplink data. Consequently, an available resource for transmission of the uplink data is reduced, an encoding rate of the uplink data is increased, and reliability of transmission of the uplink data is reduced. In addition, in a 5G new radio access technology (5G NR) protocol, a ratio of a resource occupied by the UCI in PUSCH transmission to an entire PUSCH resource is in direct proportion to a ratio of a payload size of the UCI to a transport block size (TBS) of the uplink data carried on the PUSCH. Therefore, when the TBS of the uplink data is relatively small and the payload size of the UCI is relatively large, the UCI occupies a very large proportion of the resource. Consequently, this severely affects transmission reliability of the uplink data and cannot adapt to a communication scenario with a relatively high requirement on uplink data reliability, for example, an ultra-reliable and low-latency communications (URLLC) application scenario in a 5th generation (5G) mobile communications system.

SUMMARY

This application provides an uplink information transmission method and apparatus, to resolve a prior-art problem that a high requirement on transmission reliability of uplink data cannot be met when UCI is carried on a PUSCH.

According to a first aspect, an embodiment of this application provides an uplink information transmission method. The method may be performed by a terminal device, or may be performed by a chip or a component used for a terminal device. For ease of description, the following method is described by using a terminal device as an example. The method includes: receiving downlink control information DCI, and determining, based on the DCI, a transmission resource of a physical uplink shared channel PUSCH scheduled by using the DCI, where the transmission resource of the PUSCH overlaps a transmission resource of a physical uplink control channel PUCCH in time domain, and the PUCCH is used to carry to-be-transmitted uplink control information UCI; and when a first condition is met, sending uplink data on the PUSCH, and skipping sending the UCI on the PUSCH. The first condition may be implemented in a plurality of manners. For example, a format of the DCI for scheduling the PUSCH is a format agreed on in a protocol, or the DCI includes specific information, or a TBS of uplink data carried on the PUSCH and/or payload size of the UCI complies with an agreement, or the terminal device receives instruction information instructing the terminal device not to carry the UCI on the PUSCH, or the like.

In the foregoing technical solution, the network device sends, to the terminal device, the DCI for scheduling the PUSCH, and the terminal device may determine, based on the DCI or other information, not to send the UCI on the PUSCH, that is, forbid UCI piggyback on PUSCH, thereby ensuring transmission reliability of the uplink data on the PUSCH.

In some optional implementations of the first aspect, the first condition is:

a payload size of the DCI is equal to a first value; or a payload size of the DCI is less than a first threshold; or a payload size of the DCI is equal to a second value, and a value of a DCI format identification field in the DCI is equal to a third value; or a payload size of the DCI is equal to a second value, and a search space of the DCI is a user equipment UE-specific search space; or a value of a DCI format identification field in the DCI is equal to a third value, and a search space of the DCI is a UE-specific search space; or a payload size of the DCI is equal to a second value, a value of a DCI format identification field in the DCI is equal to a third value, and a search space of the DCI is a UE-specific search space; or a value of beta-offset indicated by a beta-offset indicator field in the DCI is 0; or a value of a beta-offset indicator in the DCI is a fourth value, and the fourth value is used to instruct not to send the UCI on the PUSCH; or a value of beta-offset indicated by a beta-offset indicator field in the DCI is less than or equal to a fifth threshold; or a payload size of the UCI is greater than or equal to a second threshold; or a transport block size (TBS) of uplink data carried on the PUSCH is less than or equal to a third threshold; or a ratio of a payload size of the UCI to a TBS of the uplink data is greater than or equal to a fourth threshold; or a priority of an SR lately sent by the terminal device is greater than or equal to a sixth threshold; or a period of an SR lately sent by the terminal device is less than or equal to a seventh threshold; or an SR configuration of an SR lately sent by the terminal device belongs to a specific SR configuration set.

The foregoing thresholds (for example, the first to the seventh thresholds) or characteristic values (for example, the first to the fourth values) may be determined based on signaling. The signaling may be radio resource control RRC signaling, a media access control element, or physical layer signaling, and the physical layer signaling may be DCI.

In some optional implementations of the first aspect, the method further includes receiving instruction information, where the first condition is that the instruction information instructs not to carry the UCI on the PUSCH.

In some optional implementations of the first aspect, the method further includes: when the first condition is met, sending the UCI on a truncated resource of the PUCCH. In the foregoing technical solution, the terminal device may send the UCI on the truncated resource of the PUCCH, without sending the UCI on the PUSCH, while ensuring a requirement on transmission reliability of the uplink data. In this way, the terminal device not only can fully use a transmission resource, but also can send the UCI in a timely manner, thereby improving efficiency of communication with the network device.

In some optional implementations of the first aspect, the method further includes: when the first condition is met, discarding, by the terminal device, the UCI.

In some optional implementations of the first aspect, if the time domain resource of the PUSCH overlaps time domain resources of the plurality of PUCCHs, when the first condition is met, the terminal device sends, on the PUSCH, none of UCI to be carried on all the PUCCHs of which the time domain resources overlap the time domain resource of the PUSCH.

According to a second aspect, this application provides an uplink information transmission method. The method may be performed by a network device, or may be performed by a chip or a component used for a network device. For ease of description, the following method is described by using a network device as an example. The method includes: sending downlink control information DCI, where the DCI is used to schedule a physical uplink shared channel PUSCH, a transmission resource of the PUSCH overlaps a transmission resource of a physical uplink control channel PUCCH in time domain, and the PUCCH is used to carry to-be-transmitted uplink control information UCI; and receiving the PUSCH, where when a first condition is met, the UCI is not carried on the PUSCH.

In the foregoing technical solution, the network device sends, to the terminal device, the DCI for scheduling the PUSCH, and may determine, based on that the first condition is met, that the UCI is not carried on the PUSCH, to successfully receive the uplink data carried on the PUSCH. Because the UCI is not carried on the PUSCH, transmission reliability of the uplink data carried on the PUSCH is ensured.

In some optional implementations of the second aspect, the first condition is:

a payload size of the DCI is equal to a first value; or a payload size of the DCI is less than a first threshold; or a payload size of the DCI is equal to a second value, and a value of a DCI format identification field in the DCI is equal to a third value; or a payload size of the DCI is equal to a second value, and a search space of the DCI is a user equipment UE-specific search space; or a value of the DCI format identification field in the DCI is equal to the third value, and a search space of the DCI is the UE-specific search space; or a payload size of the DCI is equal to a second value, a value of a DCI format identification field in the DCI is equal to a third value, and a search space of the DCI is a UE-specific search space; or a value of beta-offset indicated by a beta-offset indicator field in the DCI is 0; or a value of a beta-offset indicator in the DCI is a fourth value, and the fourth value is used to instruct not to send the UCI on the PUSCH; or a value of beta-offset indicated by a beta-offset indicator field in the DCI is less than or equal to a fifth threshold; or a payload size of the UCI is greater than or equal to a second threshold; or a transport block size TBS of uplink data carried on the PUSCH is less than or equal to a third threshold; or a ratio of a payload size of the UCI to a TBS of the uplink data is greater than or equal to a fourth threshold; or a priority of an SR lately sent by the terminal device is greater than or equal to a sixth threshold; or a period of an SR lately sent by the terminal device is less than or equal to a seventh threshold; or an SR configuration of an SR lately sent by the terminal device belongs to a specific SR configuration set.

The foregoing thresholds (for example, the first to the seventh thresholds) or characteristic values (for example, the first to the fourth values) may be determined based on signaling.

In some optional implementations of the second aspect, the method further includes sending instruction information, where the first condition is that the instruction information instructs not to carry the UCI on the PUSCH.

In some optional implementations of the second aspect, if the time domain resource of the PUSCH overlaps time domain resources of a plurality of PUCCHs, when the first condition is met, the network device receives none of UCI to be carried on all the PUCCHs of which the time domain resources overlap the time domain resource of the PUSCH.

According to a third aspect, an embodiment of this application provides an uplink information transmission method. The method may be performed by a terminal device, or may be performed by a chip or a component used for a terminal device. For ease of description, the following method is described by using a terminal device as an example. The method includes: receiving downlink control information DCI, and determining, based on the DCI, a transmission resource of a physical uplink shared channel PUSCH scheduled by using the DCI, where the transmission resource of the PUSCH overlaps a transmission resource of a physical uplink control channel PUCCH in time domain, and the PUCCH is used to carry to-be-transmitted uplink control information UCI; and when a first condition is met, sending uplink data and a part of the UCI on the PUSCH.

In the foregoing technical solution, the network device sends, to the terminal device, the DCI for scheduling the PUSCH. The terminal device may determine, based on the DCI or other instruction information, not to send all content of the UCI on the PUSCH, instead, send only a part of the UCI on the PUSCH, thereby ensuring transmission reliability of the uplink data on the PUSCH.

In some optional implementations of the third aspect, the first condition is:

a payload size of the DCI is equal to a first value; or a payload size of the DCI is less than a first threshold; or a payload size of the DCI is equal to a second value, and a value of a DCI format identification field in the DCI is equal to a third value; or a payload size of the DCI is equal to a second value, and a search space of the DCI is a user equipment UE-specific search space; or a value of the DCI format identification field in the DCI is equal to the third value, and a search space of the DCI is the UE-specific search space; or a payload size of the DCI is equal to a second value, a value of a DCI format identification field in the DCI is equal to a third value, and a search space of the DCI is a UE-specific search space; or a value of beta-offset indicated by a beta-offset indicator field in the DCI is 0; or a value of a beta-offset indicator in the DCI is a fifth value, and the fifth value is used to instruct not to send the UCI on the PUSCH; or a value of beta-offset indicated by a beta-offset indicator field in the DCI is less than or equal to a fifth threshold; or a payload size of the UCI is greater than or equal to a second threshold; or a transport block size TBS of uplink data carried on the PUSCH is less than or equal to a third threshold; or a ratio of a payload size of the UCI to a TBS of the uplink data is greater than or equal to a fourth threshold; or a priority of an SR lately sent by the terminal device is greater than or equal to a sixth threshold; or a period of an SR lately sent by the terminal device is less than or equal to a seventh threshold; or an SR configuration of an SR lately sent by the terminal device belongs to a specific SR configuration set.

The foregoing thresholds or characteristic values (for example, the first to the fourth values) may be determined based on signaling.

In some optional implementations of the third aspect, the method further includes receiving instruction information, where the first condition is that the instruction information instructs to add the part of the UCI to the PUSCH.

In some optional implementations of the third aspect, the method further includes: when the first condition is met, sending, on a truncated resource of the PUCCH, a remaining part, of the UCI, that is not carried on the PUSCH. In the foregoing technical solution, the terminal device may send the remaining part of the UCI on the truncated resource of the PUCCH, based on sending of only the part of the UCI on the PUSCH, while ensuring a requirement on transmission reliability of the uplink data. In this way, the terminal device not only can fully use a transmission resource, but also can send all content of the UCI in a timely manner, thereby improving efficiency of communication with the network device.

In some optional implementations of the third aspect, when the first condition is met, the terminal device discards the remaining part, of the UCI, that is not sent on the PUSCH.

In some optional implementations of the third aspect, the part of the UCI includes a part of bit information of the UCI, or information of a preset type in the UCI, for example, a HARQ or a CSI part 1.

In some optional implementations of the third aspect, if the time domain resource of the PUSCH overlaps time domain resources of a plurality of PUCCHs, when the first condition is met, the terminal device may carry parts of all UCI on the PUSCH, or carry, on the PUSCH, all or some of UCI to be carried on some of the PUCCHs of which the time domain resources overlap the time domain resource of the PUSCH.

According to a fourth aspect, this application provides an uplink information transmission method. The method may be performed by a network device, or may be performed by a chip or a component used for a network device. For ease of description, the following method is described by using a network device as an example. The method includes: sending downlink control information DCI, where the DCI is used to schedule a physical uplink shared channel PUSCH, a transmission resource of the PUSCH overlaps a transmission resource of a physical uplink control channel PUCCH in time domain, and the PUCCH is used to carry to-be-transmitted uplink control information UCI; and receiving the PUSCH, where when a first condition is met, a part of the UCI is carried on the PUSCH.

In the foregoing technical solution, the network device sends, to the terminal device, the DCI for scheduling the PUSCH, and may determine, based on that the first condition is met, that the part of the UCI is carried on the PUSCH, to successfully receive the uplink data and the part of the UCI that are carried on the PUSCH. Because not all content of the UCI is sent on the PUSCH, transmission reliability of the uplink data is ensured.

In some optional implementations of the fourth aspect, the first condition is:

a payload size of the DCI is equal to a first value; or a payload size of the DCI is less than a first threshold; or a payload size of the DCI is equal to a second value, and a value of a DCI format identification field in the DCI is equal to a third value; or a payload size of the DCI is equal to a second value, and a search space of the DCI is a user equipment UE-specific search space; or a value of the DCI format identification field in the DCI is equal to the third value, and a search space of the DCI is the UE-specific search space; or a payload size of the DCI is equal to a second value, a value of a DCI format identification field in the DCI is equal to a third value, and a search space of the DCI is a UE-specific search space; or a value of beta-offset indicated by a beta-offset indicator field in the DCI is 0; or a value of a beta-offset indicator in the DCI is a fifth value, and the fifth value is used to instruct not to send the UCI on the PUSCH; or a value of beta-offset indicated by a beta-offset indicator field in the DCI is less than or equal to a fifth threshold; or a payload size of the UCI is greater than or equal to a second threshold; or a transport block size TBS of uplink data carried on the PUSCH is less than or equal to a third threshold; or a ratio of a payload size of the UCI to a TBS of the uplink data is greater than or equal to a fourth threshold; or a priority of an SR lately sent by the terminal device is greater than or equal to a sixth threshold; or a period of an SR lately sent by the terminal device is less than or equal to a seventh threshold; or an SR configuration of an SR lately sent by the terminal device belongs to a specific SR configuration set.

In some optional implementations of the fourth aspect, the method further includes sending instruction information, where the first condition is that the instruction information instructs to add the part of the UCI to the PUSCH.

In some optional implementations of the fourth aspect, the method further includes: when the first condition is met, receiving, on a truncated resource of the PUCCH, a remaining part, of the UCI, that is not carried on the PUSCH.

In some optional implementations of the fourth aspect, if the time domain resource of the PUSCH overlaps time domain resources of a plurality of PUCCHs, when the first condition is met, the network device receives, on the PUSCH, parts of all UCI carried on the PUSCHs of which the time domain resources overlap the time domain resource of the PUSCH, or the network device receives, on the PUSCH, all or some UCI carried on some of the PUCCHs of which the time domain resources overlap the time domain resource of the PUSCH.

According to a fifth aspect, an embodiment of this application provides an uplink information transmission method. The method may be performed by a terminal device, or may be performed by a chip or a component used for a terminal device. For ease of description, the following method is described by using a terminal device as an example. The method includes:

receiving DCI, and determining, based on the DCI, a transmission resource of a PUSCH scheduled by using the DCI; when UCI is transmitted on the PUSCH, determining, based on a total quantity of REs of the transmission resource of the PUSCH and a payload size of the UCI that is carried on the PUSCH, a first TBS of uplink data to be sent on the PUSCH; and sending the uplink data and the UCI on the PUSCH based on the first TBS. The UCI may be to-be-transmitted UCI carried on the PUCCH of which the time domain resource overlaps the time domain resource of the PUSCH, or may be the UCI scheduled by the network device and carried by the PUSCH.

In the foregoing technical solution, the TBS of the sent uplink data is determined with reference to occupation of a PUSCH resource by the UCI. This avoids a case in which transmission reliability of the uplink data is reduced due to an excessively large amount of the sent uplink data.

In some optional implementations of the fifth aspect, the determining, based on a total quantity of REs of the transmission resource of the PUSCH and a payload size of the UCI that is carried on the PUSCH, a first TBS of uplink data to be sent on the PUSCH includes: determining the total quantity of REs of the transmission resource of the PUSCH; determining a first intermediate value based on the total quantity of REs, where the first intermediate value is used to represent a second TBS used when the uplink data is sent but the UCI is not sent on the PUSCH; and determining the first TBS based on the first intermediate value and the payload size of the UCI. In the foregoing implementations, the TBS of the sent uplink data is determined with reference to occupation of a PUSCH resource by the UCI. This avoids a case in which transmission reliability of the uplink data is reduced due to an excessively large amount of the sent uplink data.

In some optional implementations of the fifth aspect, the determining, based on the first intermediate value and the payload size of the UCI, the first TBS includes: determining, based on the first intermediate value and the payload size of the UCI, the quantity of REs occupied when the UCI is sent on the PUSCH, and determining the first TBS based on a quantity of remaining REs obtained by subtracting the quantity of REs occupied when the UCI is transmitted on the PUSCH from the total quantity of REs. In the foregoing implementations, the TBS of the sent uplink data is determined with reference to occupation of a PUSCH resource by the UCI. This avoids a case in which transmission reliability of the uplink data is reduced due to an excessively large amount of the sent uplink data.

In some optional implementations of the fifth aspect, the determining, based on the first intermediate value and the payload size of the UCI, the first TBS includes: determining, based on the first intermediate value and the payload size of the UCI, the quantity of REs occupied when the UCI is sent on the PUSCH; determining a second intermediate value based on the quantity of REs occupied when the UCI is sent on the PUSCH, where the second intermediate value is used to represent a quantity of information bits that can be carried, where the quantity of information bits is determined by using the quantity of REs occupied when the UCI is carried on the PUSCH and by using a specified modulation and coding scheme and transmission scheme; and determining the first TBS based on the first intermediate value and the second intermediate value. In the foregoing implementations, the TBS of the sent uplink data is determined with reference to occupation of a PUSCH resource by the UCI. This avoids a case in which transmission reliability of the uplink data is reduced due to an excessively large amount of the sent uplink data.

In some optional implementations of the fifth aspect, the determining, based on the total quantity of REs of the transmission resource of the PUSCH and the payload size of the UCI carried on the PUSCH, the first TBS of the uplink data to be sent on the PUSCH includes:

determining the first TBS based on the first intermediate value and the payload size of the UCI, where the first intermediate value and the total quantity of REs meet a first function relationship. In the foregoing implementations, the TBS of the sent uplink data is determined with reference to occupation of a PUSCH resource by the UCI. This avoids a case in which transmission reliability of the uplink data is reduced due to an excessively large amount of the sent uplink data.

In some optional implementations of the fifth aspect, the first intermediate value is used to represent a second TBS used when uplink data is sent but UCI is not sent on the PUSCH. In the foregoing implementations, the TBS of the sent uplink data is determined with reference to occupation of a PUSCH resource by the UCI. This avoids a case in which transmission reliability of the uplink data is reduced due to an excessively large amount of the sent uplink data.

In some optional implementations of the fifth aspect, the determining the first TBS based on the first intermediate value and the payload size of the UCI includes: determining the first TBS based on a quantity of remaining REs obtained by subtracting the quantity of REs occupied when the UCI is transmitted on the PUSCH from the total quantity of REs, where the quantity of REs occupied when the UCI is sent on the PUSCH, the first intermediate value, and the payload size of the UCI meet a second function relationship. In the foregoing implementations, the TBS of the sent uplink data is determined with reference to occupation of a PUSCH resource by the UCI. This avoids a case in which transmission reliability of the uplink data is reduced due to an excessively large amount of the sent uplink data.

In some optional implementations of the fifth aspect, the determining the first TBS based on the first intermediate value and the payload size of the UCI includes: determining the first TBS based on the first intermediate value and the second intermediate value, where the second intermediate value and the quantity of REs occupied when the UCI is sent on the PUSCH meet a third function relationship, and the quantity of REs occupied when the UCI is sent on the PUSCH, the first intermediate value, and the payload size of the UCI meet a fourth function relationship. In the foregoing implementations, the TBS of the sent uplink data is determined with reference to occupation of a PUSCH resource by the UCI. This avoids a case in which transmission reliability of the uplink data is reduced due to an excessively large amount of the sent uplink data.

According to a sixth aspect, this application provides an uplink information transmission method. The method may be performed by a network device, or may be performed by a chip or a component used for a network device. For ease of description, the following method is described by using a network device as an example. The method includes: sending DCI, where the DCI is used to schedule a PUSCH; determining, based on a total quantity of REs of a transmission resource of the PUSCH and a payload size of UCI that is carried on the PUSCH, a first TBS of uplink data sent on the PUSCH; and receiving the uplink data and the UCI on the PUSCH based on the first TBS. In the foregoing technical solution, the TBS of the uplink data sent on the PUSCH is determined with reference to occupation of a PUSCH resource by the UCI, so that the PUSCH is correctly received. This avoids a case in which transmission reliability of the uplink data is reduced due to an excessively large amount of the sent uplink data.

In some optional implementations of the sixth aspect, the determining, based on a total quantity of REs of a transmission resource of the PUSCH and a payload size of UCI that is carried on the PUSCH, a first TBS of uplink data sent on the PUSCH includes: determining the total quantity of REs of the transmission resource of the PUSCH; determining a first intermediate value based on the total quantity of REs, where the first intermediate value is used to represent a second TBS used when the uplink data is sent but the UCI is not sent on the PUSCH; and determining the first TBS based on the first intermediate value and the payload size of the UCI. In the foregoing implementations, the TBS of the sent uplink data is determined with reference to occupation of a PUSCH resource by the UCI. This avoids a case in which transmission reliability of the uplink data is reduced due to an excessively large amount of the sent uplink data.

In some optional implementations of the sixth aspect, the determining, based on the first intermediate value and the payload size of the UCI, the first TBS includes: determining, based on the first intermediate value and the payload size of the UCI, the quantity of REs occupied when the UCI is sent on the PUSCH, and determining the first TBS based on a quantity of remaining REs obtained by subtracting the quantity of REs occupied when the UCI is transmitted on the PUSCH from the total quantity of REs. In the foregoing implementations, the TBS of the sent uplink data is determined with reference to occupation of a PUSCH resource by the UCI. This avoids a case in which transmission reliability of the uplink data is reduced due to an excessively large amount of the sent uplink data.

In some optional implementations of the sixth aspect, the determining, based on the first intermediate value and the payload size of the UCI, the first TBS includes: determining, based on the first intermediate value and the payload size of the UCI, the quantity of REs occupied when the UCI is sent on the PUSCH; determining a second intermediate value based on the quantity of REs occupied when the UCI is sent on the PUSCH, where the second intermediate value is used to represent a quantity of information bits that can be carried, where the quantity of information bits is determined by using the quantity of REs occupied when the UCI is carried on the PUSCH and by using a specified modulation and coding scheme and transmission scheme; and determining the first TBS based on the first intermediate value and the second intermediate value. In the foregoing implementations, the TBS of the sent uplink data is determined with reference to occupation of a PUSCH resource by the UCI. This avoids a case in which transmission reliability of the uplink data is reduced due to an excessively large amount of the sent uplink data.

In some optional implementations of the sixth aspect, the determining, based on the total quantity of REs of the transmission resource of the PUSCH and the payload size of the UCI carried on the PUSCH, the first TBS of the uplink data sent on the PUSCH includes:

determining the first TBS based on the first intermediate value and the payload size of the UCI, where the first intermediate value and the total quantity of REs meet a first function relationship. In the foregoing implementations, the TBS of the sent uplink data is determined with reference to occupation of a PUSCH resource by the UCI. This avoids a case in which transmission reliability of the uplink data is reduced due to an excessively large amount of the sent uplink data.

In some optional implementations of the sixth aspect, the first intermediate value is used to represent a second TBS used when uplink data is sent but UCI is not sent on the PUSCH. In the foregoing implementations, the TBS of the sent uplink data is determined with reference to occupation of a PUSCH resource by the UCI. This avoids a case in which transmission reliability of the uplink data is reduced due to an excessively large amount of the sent uplink data.

In some optional implementations of the sixth aspect, the determining the first TBS based on the first intermediate value and the payload size of the UCI includes: determining the first TBS based on a quantity of remaining REs obtained by subtracting the quantity of REs occupied when the UCI is transmitted on the PUSCH from the total quantity of REs, where the quantity of REs occupied when the UCI is sent on the PUSCH, the first intermediate value, and the payload size of the UCI meet a second function relationship. In the foregoing implementations, the TBS of the sent uplink data is determined with reference to occupation of a PUSCH resource by the UCI. This avoids a case in which transmission reliability of the uplink data is reduced due to an excessively large amount of the sent uplink data.

In some optional implementations of the sixth aspect, the determining the first TBS based on the first intermediate value and the payload size of the UCI includes: determining the first TBS based on the first intermediate value and the second intermediate value, where the second intermediate value and the quantity of REs occupied when the UCI is sent on the PUSCH meet a third function relationship, and the quantity of REs occupied when the UCI is sent on the PUSCH, the first intermediate value, and the payload size of the UCI meet a fourth function relationship. In the foregoing implementations, the TBS of the sent uplink data is determined with reference to occupation of a PUSCH resource by the UCI. This avoids a case in which transmission reliability of the uplink data is reduced due to an excessively large amount of the sent uplink data.

According to a seventh aspect, this application provides an uplink information transmission method. The method may be performed by a terminal device, or may be performed by a chip or a component applied to a terminal device. The method includes: determining information about a higher layer configured PUSCH; when a second condition is met, sending uplink data on the higher layer configured PUSCH, and skipping sending UCI on the higher layer configured PUSCH, where a transmission resource of the UCI partially or completely overlaps a transmission resource of the higher layer configured PUSCH in time domain. According to this method, the UCI is controlled not to be transmitted on the PUSCH, to minimize impact of UCI transmission on reliability on grant-free data transmission when the transmission resource of the UCI partially or completely overlaps a transmission resource of grant-free data in time domain.

In a possible implementation of the seventh aspect, the information about the higher layer configured PUSCH includes at least one of an RV sequence used during higher layer configured PUSCH transmission, a period P, a quantity K of TOs in the period P, and an MCS used during the higher layer configured PUSCH transmission.

In a possible implementation of the seventh aspect, the second condition is any one of the following conditions:

the RV used during the higher layer configured PUSCH transmission is 0 or 3;

a number n of the TO used during the higher layer configured PUSCH transmission in all the TOs in the period is greater than or equal to a threshold $K_1$;

an encoding rate R used during the higher layer configured PUSCH transmission is greater than or equal to a threshold $R_1$;

a quantity $n_2$ of transmission times of a TB in the higher layer configured PUSCH transmission is less than or equal to a threshold $K_2$; and when transmission of the UCI is triggered by DCI sent by a network device, a quantity $n_3$ of symbols from the last time domain symbol occupied by the DCI to the first symbol of a time domain resource of the UCI that overlaps a time domain resource of the higher layer configured PUSCH is less than or equal to a threshold $K_3$.

According to an eighth aspect, this application provides an uplink information transmission method. The method may be performed by a network device, or may be performed by a chip or a component applied to a network device. The method includes: when a second condition is met, receiving uplink data on a higher layer configured PUSCH, where a transmission resource of the higher layer configured PUSCH does not carry UCI, and a transmission resource of the UCI partially or completely overlaps the transmission resource of the higher layer configured PUSCH in time domain; and demodulating and decoding the data on the higher layer configured PUSCH. According to this method, the UCI is controlled not to be transmitted on the PUSCH, to minimize impact of UCI transmission on reliability on grant-free data transmission when the transmission resource of the UCI partially or completely overlaps a transmission resource of grant-free data in time domain.

In a possible implementation of the eighth aspect, the information about the higher layer configured PUSCH includes at least one of an RV sequence used during higher layer configured PUSCH transmission, a period P, a quantity K of TOs in the period P, and an MCS used during the higher layer configured PUSCH transmission.

In a possible implementation of the eighth aspect, the second condition is any one of the following conditions:

the RV used during the higher layer configured PUSCH transmission is 0 or 3;

a number n of the TO used during the higher layer configured PUSCH transmission in all the TOs in the period is greater than or equal to a threshold $K_1$;

an encoding rate R used during the higher layer configured PUSCH transmission is greater than or equal to a threshold $R_1$;

a quantity $n_2$ of transmission times of a TB in the higher layer configured PUSCH transmission is less than or equal to a threshold $K_2$; and when transmission of the UCI is triggered by DCI sent by a network device, a quantity $n_3$ of symbols from the last time domain symbol occupied by the DCI to the first symbol of a time domain resource of the UCI that overlaps a time domain resource of the higher layer configured PUSCH is less than or equal to a threshold $K_3$.

According to a ninth aspect, this application provides an uplink information transmission apparatus. The apparatus is configured to perform the method in any one of the first aspect to the eighth aspect or any optional implementation of any one of the aspects. Specifically, the apparatus includes modules configured to perform the method in any one of the first aspect to the eighth aspect or any optional implementation of any one of the aspects.

According to a tenth aspect, this application provides a communications apparatus, including a memory, a processor, and a communications interface. The memory is configured to store a computer instruction. The communications interface is configured to communicate with another communications apparatus. The processor is connected to the memory and the communications interface, and is configured to execute the computer instruction, to perform the method in any one of the first aspect to the eighth aspect or any optional implementation of any one of the aspects.

According to an eleventh aspect, this application provides a computer-readable storage medium, the computer-readable storage medium stores a computer instruction, and when the instruction is run on a computer, the computer is enabled to perform the method in any one of the first aspect to the eighth aspect or any optional implementation of any one of the aspects.

According to a twelfth aspect, this application provides a computer program product, and when the computer program product runs on a computer, the computer is enabled to perform the method in any one of the first aspect to the eighth aspect or any optional implementation of any one of the aspects.

According to a thirteenth aspect, this application provides a chip. The chip is configured to perform the method in any one of the first aspect to the eighth aspect or any optional implementation of any one of the aspects.

DETAILED DESCRIPTION OF ILLUSTRATIVE EMBODIMENTS

To make the objectives, technical solutions, and advantages of this application clearer, the following further describes this application in detail with reference to the accompanying drawings.

In this application, "a plurality of" means two or more than two. In addition, in the descriptions of this application, terms such as "first" and "second" are merely used for distinction and description, and shall not be understood as an indication or implication of relative importance or an indication or implication of an order. The term "and/or" in this application describes only an association relationship for describing associated objects and represents that three relationships may exist. For example, A and/or B may represent the following three cases: Only A exists, both A and B exist, and only B exists. In the text description of this application, the character "/" represents an "or" relationship between the associated objects. In a formula, the character "/" indicates a "division" relationship between the associated objects.

Figure 1:
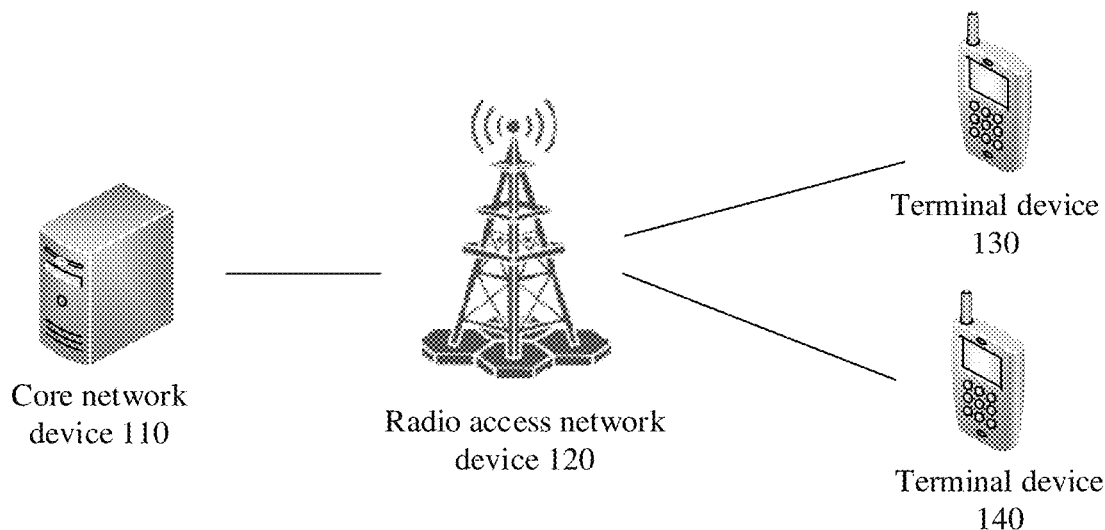
FIG. 1 is a schematic diagram of a communications system according to an embodiment of this application.

FIG. 1 is a schematic architectural diagram of a mobile communications system to which an embodiment of this application is applied. As shown in FIG. 1, the mobile communications system includes a core network device 110, a radio access network device 120, and at least one terminal device (for example, a terminal device 130 and a terminal device 140 in FIG. 1). The terminal device is connected to the radio access network device in a wireless manner, and the radio access network device is connected to the core network device in a wireless or wired manner. The core network device and the radio access network device may be independent different physical devices, or a function of the core network device and a logical function of the radio access network device may be integrated into a same physical device, or some functions of the core network device and some functions of the radio access network device may be integrated into a physical device. The terminal device may be at a fixed location or may be mobile. FIG. 1 is merely a schematic diagram. The communications system may further include another network device, and for example, may further include a wireless relay device and a wireless backhaul device, which are not drawn in FIG. 1. Quantities of core network devices, radio access network devices, and terminal devices included in the mobile communications system are not limited in the embodiments of this application.

The radio access network device is an access device used by the terminal device to connect to the mobile communications system in a wireless manner. The radio access network device may be a base station (Node B), an evolved base station (eNB), a base station in a 5G mobile communications system or a new radio (NR) communications system, a base station in a future mobile communications system, an access node in a Wi-Fi system, or the like. A specific technology and a specific device form used by the radio access network device are not limited in the embodiments of this application. In this application, the radio access network device is briefly referred to as a network device. Unless otherwise specified, in this application, all network devices are radio access network devices. In this application, the terms 5G and NR may be equivalent.

The terminal device may also be referred to as a terminal, user equipment (UE), a mobile station (MS), a mobile terminal (MT), or the like. The terminal device may be a mobile phone, a tablet, a computer having a wireless transceiver function, a virtual reality (VR) terminal, an augmented reality (AR) terminal, a wireless terminal in industrial control, a wireless terminal in unmanned driving, a wireless terminal in remote surgery, a wireless terminal in smart grid, a wireless terminal in transportation safety, a wireless terminal in smart city, a wireless terminal in smart home, or the like.

The terminal is a device having a wireless transceiver function, may be deployed on land, and includes an indoor device, an outdoor device, a handheld device, or a vehicle-mounted device. The terminal may alternatively be deployed on a water surface. The terminal may alternatively be deployed on an aircraft, a balloon, and a satellite in the air. An application scenario of the radio access network device and the terminal device is not limited in the embodiments of this application.

Communication between the radio access network device and the terminal device and communication between the terminal devices may be performed by using a licensed spectrum, or may be performed by using an unlicensed spectrum, or may be performed by using both a licensed spectrum and an unlicensed spectrum. Communication between the radio access network device and the terminal device and communication between the terminal devices may be performed by using a spectrum below 6 gigahertzs (GHz), or may be performed by using a spectrum above 6 GHz, or may be performed by using both a spectrum below 6 GHz and a spectrum above 6 GHz. A spectrum resource used between the radio access network device and the terminal device is not limited in the embodiments of this application.

A network device in the following content in the embodiments of this application may be the radio access network device shown in FIG. 1, and a terminal device in the following content may be the terminal device 130 and the terminal device 140 shown in FIG. 1.

It should be understood that in this application, steps performed by the network device may alternatively be specifically performed by a module or a component of the network device, for example, may be performed by a chip in the network device, and steps performed by the terminal device may alternatively be specifically performed by a module of the terminal device, for example, may be performed by a chip in the terminal device.

It should be further understood that a formula and an expression in the embodiments of this application are merely examples of possible forms of listing and determining a parameter, and cannot be used to limit the embodiments of this application.

Figure 2:
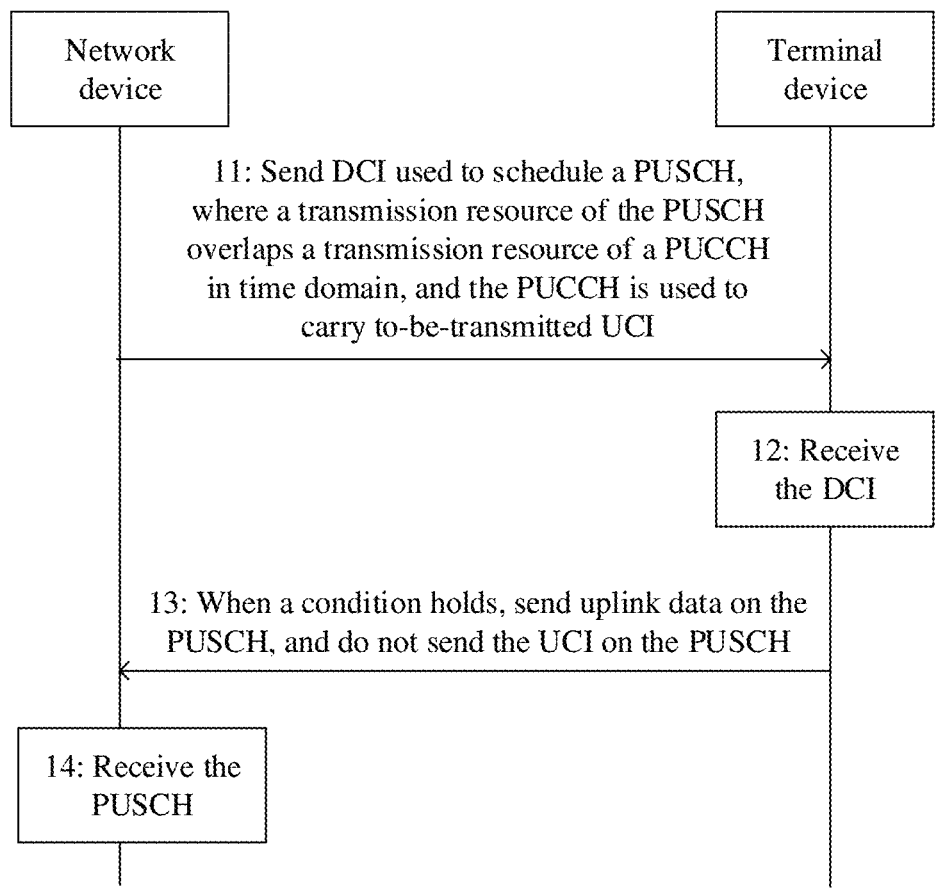
FIG. 2 is a schematic flowchart of an uplink information transmission method according to an embodiment of this application.

FIG. 2 shows an uplink information transmission method according to an embodiment of this application. The method includes the following steps.

Figure 3:
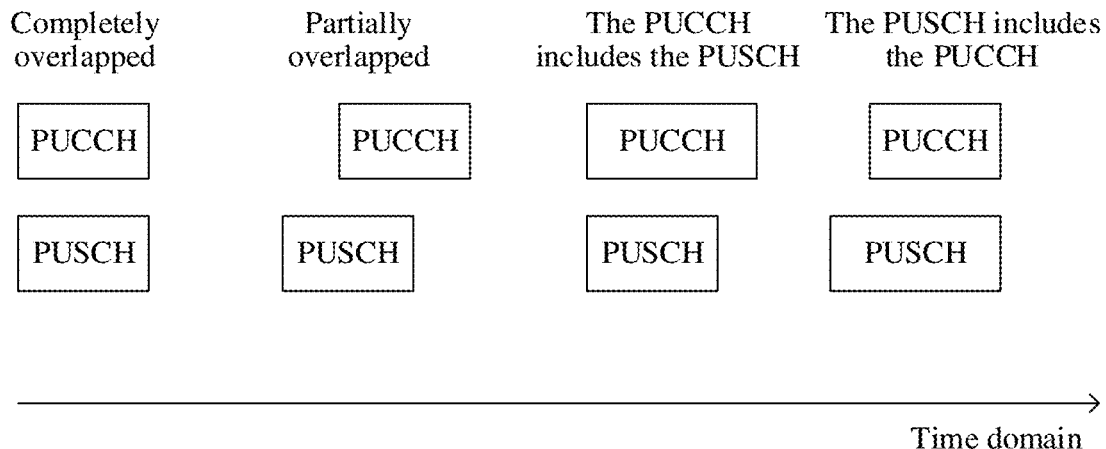
FIG. 3 is a schematic diagram of time domain overlapping between a transmission resource of a PUSCH and a transmission resource of a PUCCH.

Step 11: A network device sends downlink control information (DCI), where the DCI is used to schedule an uplink data channel, for example, a physical uplink shared channel PUSCH, and the DCI may also be referred to as an uplink grant (UL grant). A transmission resource of the PUSCH scheduled by using the DCI overlaps a transmission resource of a physical uplink control channel PUCCH in time domain, and the PUCCH is used to carry to-be-transmitted uplink control information UCI. FIG. 3 shows a plurality of possible cases in which time domain resources of a PUSCH and a PUCCH overlap. For example, a time domain resource of the PUSCH completely overlaps a time domain resource of the PUCCH, or a time domain resource of the PUSCH partially overlaps a time domain resource of the PUCCH, or a time domain resource of the PUSCH includes a time domain resource of the PUCCH and occupies more time domain resources, or a time domain resource of the PUCCH includes a time domain resource of the PUSCH and occupies more time domain resources. The time domain resource of the PUCCH may be determined according to instruction information sent by the network device, and the instruction information may be carried in signaling sent by the network device to the terminal device. The signaling in this embodiment of this application may be radio resource control (RRC) signaling, a medium access control (MAC) control element (CE), or physical layer signaling. The physical layer signaling herein may be DCI. The PUCCH is used to carry UCI. The UCI may be one or more of a hybrid automatic repeat request (HARQ) acknowledgement/negative acknowledgement (ACK/NACK), periodic channel state information (P-CSI), semi-persistent channel state information (SP-CSI), and aperiodic channel state information (A-CSI). In the following content of this application, the HARQ-ACK/NACK is referred to as a HARQ for short, and the P-CSI, the SP-CSI, and the A-CSI each include two parts: a part 1 and a part 2. In addition, the P-CSI, the SP-CSI, and the A-CSI may also be collectively referred to as channel state information (CSI).

Step 12: The terminal device receives the DCI for scheduling the PUSCH, and determines, based on the DCI, the transmission resource of the physical uplink shared channel PUSCH scheduled by using the DCI.

Step 13: When a first condition is met, the terminal device sends uplink data on the PUSCH, and does not send the UCI on the PUSCH. The first condition may be implemented in a plurality of manners. For example, a format of the DCI for scheduling the PUSCH is a format agreed on in a protocol, or the DCI includes specific information, or a TBS of uplink data carried on the PUSCH and/or a payload size of the UCI complies with an agreement, or the terminal device receives instruction information instructing the terminal device not to carry the UCI on the PUSCH, or the like.

Step 14: The network device receives the PUSCH, where when the first condition is met, the UCI is not carried on the PUSCH.

In the foregoing technical solution, the network device sends, to the terminal device, the DCI for scheduling the PUSCH. The terminal device may determine, based on the DCI or other instruction information, not to send the UCI on the PUSCH, that is, to disable UCI piggyback on PUSCH, thereby ensuring transmission reliability of the uplink data on the PUSCH.

It should be understood that, in step 14, before receiving the PUSCH, the network device may determine that the first condition in step 13 is met, to determine that the UCI is not carried on the PUSCH, and then the network device may receive the uplink data on the PUSCH but does not receive the UCI.

It should be understood that a time domain resource of a PUSCH may overlap time domain resources of a plurality of PUCCHs, and each of the plurality of PUCCHs is used to carry to-be-transmitted UCI. When the first condition is met, the terminal device may not send the UCI on the PUSCH.

In an optional design, the first condition in step 13 may be that the DCI for scheduling the PUSCH meets any one of the following:

a1. A payload size of the DCI is equal to a first value, the first value is a smallest value of payload sizes of the DCI for scheduling the PUSCH, and the payload size of the DCI for scheduling the PUSCH or the smallest value thereof may be predefined or configured by using higher layer signaling.

a2. A payload size of the DCI is less than a first threshold, the first threshold is less than or equal to a payload size of fallback DCI, the fallback DCI is used to schedule a PUSCH or a physical downlink shared channel (PDSCH), and a field included in the fallback DCI and a meaning of each field are predefined, and are irrelevant to the higher-layer configuration. For specific implementation of the fallback DCI, refer to various prior arts. For example, the fallback DCI is in a Format 0_0 or a Format 1_0 in NR Release 15 (NR Rel-15).

a3. A payload size of the DCI is equal to a second value, a value of a DCI format identification field in the DCI is equal to a third value, the second value may be a payload size of fallback DCI, and that the value of the DCI format identification field is equal to the third value is used to indicate that the DCI is not the fallback DCI.

a4. A payload size of the DCI is equal to the second value, a search space of the DCI is a user equipment UE-specific search space, and the UE-specific search space may be predefined or may be configured by using higher layer signaling.

a5. A value of a DCI format identification field in the DCI is equal to the third value, and a search space of the DCI is the UE-specific search space.

a6. A payload size of the DCI is equal to the second value, a value of a DCI format identifier field in the DCI is equal to the third value, and a search space of the DCI is the UE-specific search space.

a7. A value of beta-offset indicated by a beta-offset indicator field in the DCI is 0. The beta-offset indicator field is used to indicate the value of beta-offset. For example, the beta-offset indicator field may have a plurality of values. For example, when a width of the beta-offset indicator field is 2 bits, the field may have four values: 00, 01, 10, and 11. One value of one beta-offset indicator field may correspond to one value of beta-offset. For example, when the beta-offset indicator field is 00, the value of beta-offset is 0; or when the beta-offset indicator field is 01, the value of beta-offset is 1. One value of one beta-offset indicator field may alternatively correspond to a group of values of beta-offset. For example, when the beta-offset indicator field is 00, the beta-offset indicator field corresponds to three values of beta-offset 1, beta-offset 2, and beta-offset 3, which are respectively used to indicate values of beta-offset corresponding to the HARQ-ACK, the CSI part 1, and the CSI part 2. In this embodiment of this application, when a value of one beta-offset indicator field corresponds to a plurality of values of beta-offset, "a value of beta-offset indicated by the beta-offset indicator field in the DCI" is a largest value of the plurality of values of beta-offset indicated by the beta-offset indicator field. beta-offset is used to represent an MCS offset, and may be used to determine a quantity of resources (for example, a quantity of resource elements (RE)) occupied by UCI carried on a PUSCH. When a value of beta-offset is 0, it indicates that the quantity of REs occupied when the UCI is transmitted on the PUSCH is 0, and indirectly indicates that the UCI does not need to be piggybacked on the PUSCH.

a8. A value of a beta-offset indicator in the DCI is a fourth value, and the fourth value is used to instruct the terminal device not to send the UCI on the PUSCH.

a9. A value of beta-offset indicated by a beta-offset indicator field in the DCI is less than or equal to a fifth threshold, and the fifth threshold may be configured by the network device for the terminal device by using signaling.

It should be understood that the second value, the third value, the fourth value, the first threshold, and the fifth threshold may be predefined, or may be configured by the network device for the terminal device by using signaling. When any one of the foregoing conditions a1 to a9 is met, it may indicate that the uplink data carried on the PUSCH may be data of a URLLC service, or a requirement on transmission reliability of the uplink data carried on the PUSCH is relatively high.

In the foregoing technical solution, when the requirement on transmission reliability of the uplink data carried on the PUSCH is relatively high, the network device may generate DCI that meets any one of the foregoing conditions a1 to a9, and send the DCI to the terminal device. The terminal device determines that the DCI meets an agreed condition, and then determines not to send the UCI on the PUSCH, thereby ensuring transmission reliability of the uplink data. The network device may determine, based on a service type to which the uplink data belongs and the like, that the uplink data has a relatively high requirement on reliability.

In an optional design, the first condition in step 13 may be that the TBS of the uplink data carried on the PUSCH and/or the payload size of the UCI meets any one of the following:

b1. The payload size of the UCI is greater than or equal to a second threshold, where the payload size of the UCI may be a quantity of original information bits of the UCI, or may be a quantity of information bits obtained after check information (for example, cyclic redundancy check (CRC)) is added to the UCI, or may be a quantity of equivalent information bits obtained after check information is added to the UCI and beta-offset is considered. In addition, when one PUCCH carries a plurality of types of UCI (such as a HARQ and A-CSI), a payload size of UCI is a sum of payload sizes of all types of UCI carried by the PUCCH. For a specific manner of determining the payload size of the UCI, refer to various technical means in the prior art.

b2. The TBS of the uplink data carried on the PUSCH is less than or equal to a third threshold. For a manner of determining the TBS of the uplink data, refer to various technical means in the prior art. The TBS of the uplink data may be determined based on information such as resource allocation in the DCI. For details, refer to various existing technical means.

b3. A ratio of the payload size of the UCI to the TBS of the uplink data is greater than or equal to a fourth threshold.

It should be understood that the second threshold, the third threshold, and the fourth threshold may be predefined, or may be configured by using RRC signaling, or may be indicated by using a MAC CE or DCI sent by the network device. When any one of the foregoing conditions b1 to b3 is met, it may indicate that the uplink data carried on the PUSCH may be data of a URLLC service, or a requirement on transmission reliability of the uplink data carried on the PUSCH is relatively high.

In the foregoing technical solution, the terminal device may determine, based on the TBS of the uplink data carried on the PUSCH scheduled by the network device and/or the payload size of the UCI, not to send the UCI on the PUSCH, thereby ensuring transmission reliability of the uplink data.

It should be understood that when the time domain resource of the PUSCH overlaps time domain resources of a plurality of PUCCHs, the payload size of the UCI in the conditions b1 and b3 may be a sum of UCI on all the PUCCHs that overlap the PUSCH in time domain. When the condition b1 or b3 is met, the terminal device may not send any UCI on the PUSCH.

Figure 4:
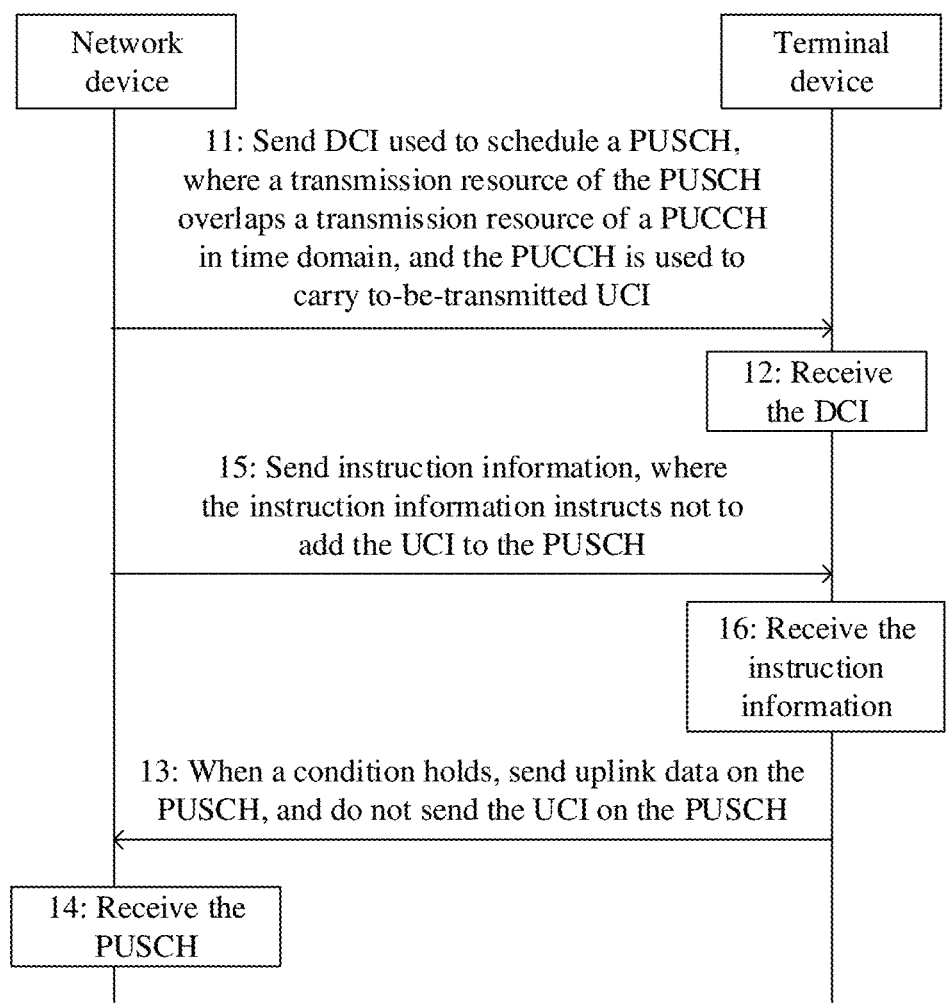
FIG. 4 and FIG. 5 are schematic flowcharts of optional implementations of an uplink information transmission method.

In an optional design, referring to FIG. 4, before step 13, the method further includes:

Step 15: The network device sends instruction information, where the instruction information instructs not to carry the UCI on the PUSCH. The network device may send the instruction information to the terminal device when determining that the requirement on transmission reliability of the uplink data carried on the PUSCH is relatively high.

Step 16: The terminal device receives the instruction information. The instruction information may be carried in the DCI.

In this case, the first condition in step 13 is that the instruction information received by the terminal device instructs not to carry the UCI on the PUSCH.

It should be understood that step 15 may be performed before step 11, or may be performed after step 11 and before step 13, and step 16 may be performed before step 12, or may be performed after step 12 and before step 13.

In the foregoing technical solution, the network device may send, to the terminal device, the instruction information instructing not to carry the UCI on the PUSCH. The terminal device does not send, based on the instruction information, the UCI on the PUSCH, thereby ensuring transmission reliability of the uplink data.

In an optional design, the first condition in step 13 may be that a scheduling request (SR) lately sent by the terminal device or a manner of sending the SR meets any one of the following:

c1. A priority of the SR lately sent by the terminal device is greater than or equal to a sixth threshold.

c2. A period of the SR lately sent by the terminal device is less than or equal to a seventh threshold.

c3. An SR configuration of the SR lately sent by the terminal device belongs to a specific SR configuration set.

It should be understood that the sixth threshold, the seventh threshold, and the specific SR configuration set may be predefined, or may be configured by using RRC signaling, or may be indicated by a MAC CE or DCI sent by the network device. When any one of the foregoing conditions c1 to c3 is met, it may indicate that the priority of the SR lately sent by the terminal device is relatively high, and that the priority of the SR lately sent by the terminal device is relatively high indicates that a requirement on transmission reliability of the uplink data on the PUSCH this time is relatively high.

In the foregoing technical solution, the terminal device may determine, based on recently sent SRs, that a priority of the lately sent SR is relatively high, and further determine that a requirement on reliability of this time of transmission of the uplink data on the PUSCH is relatively high. In addition, based on this, the terminal device determines not to send the UCI on the PUSCH, thereby ensuring transmission reliability of the uplink data.

Alternatively, the first condition in step 13 may be that an MCS table corresponding to the PUSCH is a first MCS table. Specifically, the first MCS table may be one or more of a plurality of MCS tables that are configured by using higher layer signaling and that are used for transmission of the uplink data, and spectral efficiency corresponding to an MCS index having lowest spectral efficiency in the first MCS table is the lowest in the plurality of MCS tables. A method for determining, by the terminal device, the MCS table corresponding to the PUSCH may be one of the following methods: (1) When the DCI for scheduling the PUSCH is not fallback DCI, for example, when the DCI for scheduling the PUSCH is in a DCI format 0_1 defined in an NR protocol, and when the DCI for scheduling the PUSCH is scrambled by using a new RNTI, for example, the DCI for scheduling the PUSCH is scrambled by using an MCS-C-RNTI defined in the NR protocol, the MCS table corresponding to the PUSCH is the first MCS table; and (2) when a value of a first parameter corresponding to the PUSCH is a first preset value, for example, a value of an RRC parameter "mcs-table" in the NR protocol is "qam64LowSE", the MCS table corresponding to the PUSCH is the first MCS table.

In an optional manner, when the first condition is met, the terminal device discards the UCI. It should be understood that when the time domain resource of the PUSCH overlaps time domain resources of the plurality of PUCCHs, the terminal device may discard the UCI carried on all the PUCCHs that overlap the PUSCH in time domain.

Figure 5:
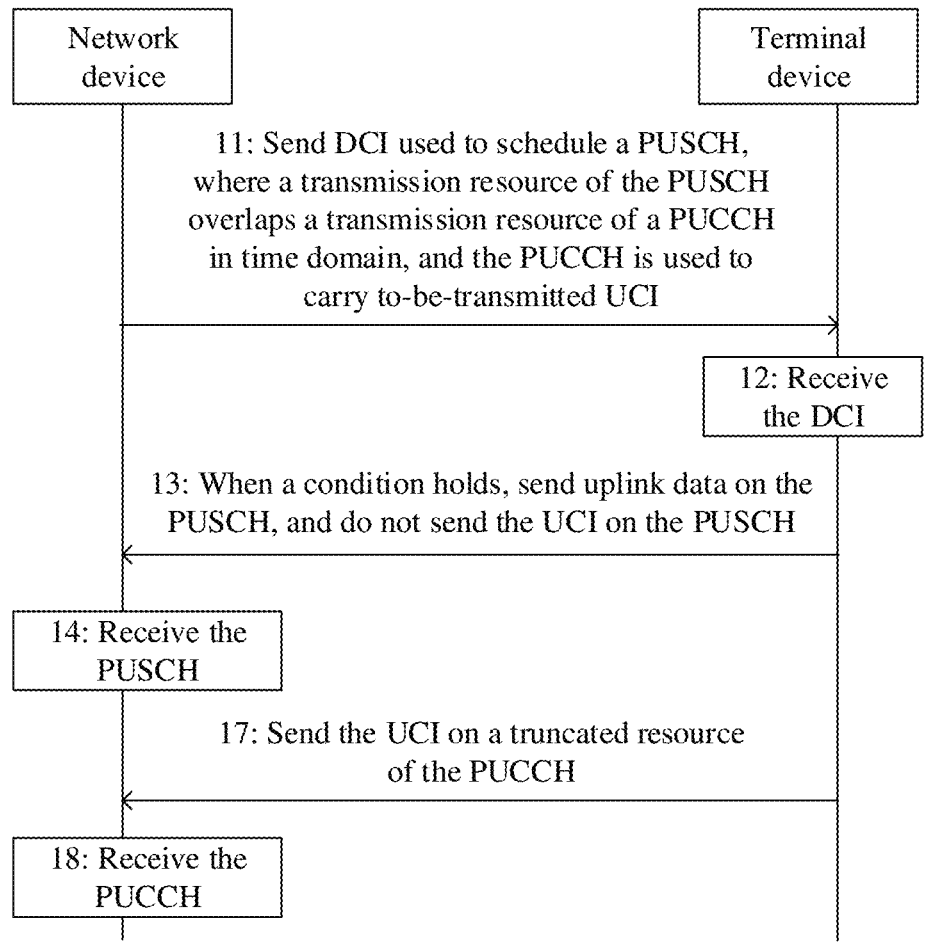
Figure 6:
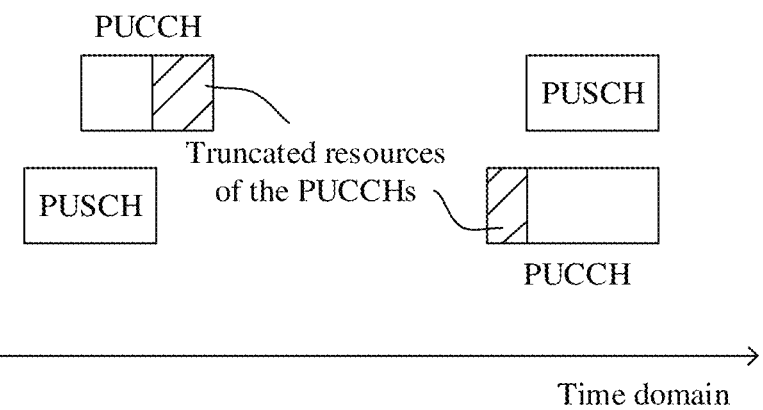
FIG. 6 is a schematic diagram of a truncated transmission resource of a PUCCH.

In an optional design, referring to FIG. 5, after step 12, the method further includes:

Step 17: When the first condition is met, the terminal device sends UCI on a truncated resource of the PUSCH. Referring to FIG. 6, the truncated resource of the PUCCH is a remaining resource obtained after a resource of the PUCCH overlapping a resource of a PUSCH in time domain is subtracted from a PUCCH resource.

Step 18: The network device receives the UCI sent on the truncated resource of the PUCCH.

It should be understood that step 17 may be performed after step 12 and before step 13, or may be performed after step 13, and step 18 may be performed before step 14, or may be performed after step 14.

In the foregoing technical solution, the terminal device may send the UCI on the truncated resource of the PUCCH, without sending the UCI on the PUSCH, while ensuring a requirement on transmission reliability of the uplink data. In this way, the terminal device not only can fully use a transmission resource, but also can send the UCI in a timely manner, thereby improving efficiency of communication with the network device.

It should be understood that when the time domain resource of the PUSCH overlaps the time domain resources of the plurality of PUCCHs, the terminal device may send, on truncated resources of all or some of the PUCCHs that overlap the PUSCH in time domain, UCI carried on the PUCCHs.

Figure 7:
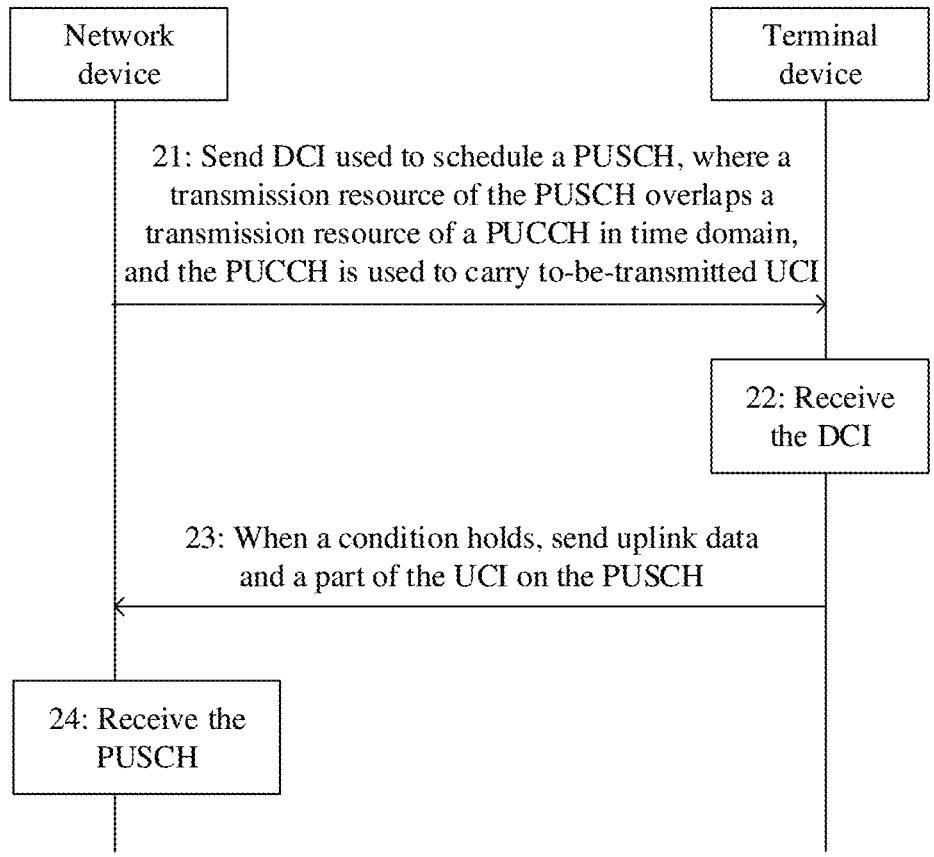
FIG. 7 is a schematic flowchart of another uplink information transmission method according to an embodiment of this application.

FIG. 7 shows another uplink information transmission method according to an embodiment of this application. The method includes the following steps.

Step 21: A network device sends DCI, where the DCI is used to schedule an uplink data channel, for example, a physical uplink shared channel PUSCH, a transmission resource of the PUSCH scheduled by using the DCI overlaps a transmission resource of a physical uplink control channel PUCCH in time domain, and the PUCCH is used to carry to-be-transmitted uplink control information UCI.

Step 22: The terminal device receives the DCI for scheduling the PUSCH, and determines, based on the DCI, the transmission resource of the physical uplink shared channel PUSCH scheduled by using the DCI.

Step 23: When a first condition is met, the terminal device sends uplink data and a part of the UCI on the PUSCH. The part of the UCI is not limited to a HARQ, and may alternatively be A-CSI, a CSI part 1 (regardless of whether the CSI is A-CSI, P-CSI, or SP-CSI), or the like, or may be a part of bit information of the UCI. Whether the part of the UCI is specifically the HARQ, the CSI, or the part of the bit information of the UCI and a specific quantity of the part of the bit information of the UCI may be predefined, may be configured by using RRC signaling, or may be indicated by a MAC CE or DCI sent by a network device. A manner of predefining or configuring the quantity of the part of the bit information of the UCI may be: first, predefining or configuring a value of the part of the bit information of the UCI; second, predefining or configuring a scaling factor. The terminal device may multiply, by the scaling factor, a TBS of uplink data that can be transmitted on the PUSCH when no UCI is carried on the PUSCH, to determine the quantity of the part of the bit information of the UCI. In addition, the first condition in step 23 may be the same as the first condition in step 13.

Step 24: The network device receives the PUSCH, where when the first condition is met, the uplink data and the part of the UCI are carried on the PUSCH.

Alternatively, the part of the UCI may be one or more of A/N that meets a third condition, CSI that meets a fourth condition, and an SR that meets a fifth condition. Herein, A/N refers to HARQ-ACK/NACK. For example, the part of the UCI may be A/N that meets the third condition, or may be CSI that meets the fourth condition, or may be an SR that meets the fifth condition, or may be A/N that meets the third condition and CSI that meets the fourth condition, or may be CSI that meets the fourth condition and an SR that meets the fifth condition, or may be A/N that meets the third condition and an SR that meets the fifth condition, or may be A/N that meets the third condition, CSI that meets the fourth condition, and an SR that meets the fifth condition.

The third condition may be one of the following conditions.

(1) An MCS table corresponding to a PDSCH corresponding to A/N is a second MCS table. The second MCS table may be one of a plurality of MCS tables that are configured by using higher layer signaling and that are used for downlink data transmission. Spectral efficiency corresponding to an MCS index having lowest spectral efficiency in the second MCS table is the lowest in the plurality of MCS tables. A method for determining, by the terminal device, the MCS table corresponding to the PDSCH may be one of the following methods: (a) when the DCI for scheduling the PDSCH is not fallback DCI, for example, when the DCI for scheduling the PDSCH is in a DCI format 0_1 defined in an NR protocol, and when the DCI for scheduling the PDSCH is scrambled by using a new RNTI, for example, the DCI for scheduling the PDSCH is scrambled by using an MCS-C-RNTI defined in the NR protocol, the MCS table corresponding to the PDSCH is the second MCS table; and (b) when a value of a second parameter corresponding to the PDSCH is a second preset value, for example, a value of an RRC parameter "mcs-table" in the NR protocol is "qam64LowSE", the MCS table corresponding to the PDSCH is the second MCS table.

(2) The DCI for scheduling the PDSCH corresponding to the A/N satisfies: a payload size of the DCI is equal to a first value; or a payload size of the DCI is less than a first threshold; or a payload size of the DCI is equal to a second value, and a value of a DCI format identification field in the DCI is equal to a third value; or a payload size of the DCI is equal to a second value, and a search space of the DCI is a user equipment UE-specific search space; or a value of a DCI format identification field in the DCI is equal to a third value, and a search space of the DCI is a UE-specific search space; or a payload size of the DCI is equal to the second value, a value of the DCI format identification field in the DCI is equal to a third value, and a search space of the DCI is a UE-specific search space.

(3) The DCI for scheduling the PDSCH corresponding to the A/N includes a first field, and the first field indicates that data carried on the PDSCH is low-latency and high-reliable data.

The fourth condition may be one of the following conditions.

(1) A CQI table corresponding to the CSI is a first CQI table. The first CQI table is one of a plurality of CQI tables that are configured by using higher layer signaling and that are used for a channel feedback. Spectral efficiency corresponding to an effective smallest CQI index in the first CQI table is the lowest in the foregoing plurality of tables, or a target block error rate (BLER) associated with the first CQI table is the smallest in the plurality of CQI tables.

(2) The CSI is A-CSI carried on the PUCCH. The A-CSI may be triggered by the DCI.

(3) The CSI is A-CSI that is triggered by the DCI and that has a feedback delay less than or equal to an eighth threshold. The eighth threshold may be configured by using higher layer signaling.

The fifth condition may be one of the following conditions.

(1) An SR configuration corresponding to the SR belongs to a first SR configuration set. The first SR configuration set may be configured by using higher layer signaling or predefined in a protocol.

(2) A priority of a logical channel associated with the SR configuration corresponding to the SR is greater than or equal to a ninth threshold, or an index number of the logical channel associated with the SR configuration corresponding to the SR is less than or equal to a tenth threshold. The ninth threshold and the tenth threshold may be configured by using higher layer signaling or predefined in a protocol.

(3) A period of the SR is less than or equal to an eleventh threshold, and a time length of the PUCCH that carries the SR is less than or equal to a twelfth threshold. The eleventh threshold and the twelfth threshold may be configured by using higher layer signaling or predefined in a protocol. Optionally, the eleventh threshold is two time domain symbols.

It may be understood that, in the embodiments of this application, the PDSCH, the PDCCH, the PUSCH, and the PUCCH are merely examples of a downlink data channel, a downlink control channel, an uplink data channel, and an uplink control channel. In different systems and different scenarios, the data channel and the control channel may have different names, and this is not limited in the embodiments of this application.

In the embodiments of this application, the higher layer signaling may be RRC signaling, or may be a medium access control (MAC) control element (CE).

In the foregoing technical solution, the network device sends, to the terminal device, the DCI for scheduling the PUSCH. The terminal device may determine, based on the DCI or other instruction information, not to send all content of the UCI on the PUSCH, that is, to send only a part of the UCI on the PUSCH, thereby ensuring transmission reliability of the uplink data on the PUSCH.

It should be understood that, in step 24, before receiving the PUSCH, the network device may determine that the first condition in step 23 is met, to determine that the part of the UCI is carried on the PUSCH, and further the network device may receive the part of the UCI on the PUSCH.

It should be understood that the time domain resource of the PUSCH may overlap time domain resources of a plurality of PUCCHs, and each of the plurality of PUCCHs is used to carry to-be-transmitted UCI. When the first condition is met, the terminal device may add, to the PUSCH for sending, a part of UCI corresponding to each of all the PUCCHs that overlap the PUSCH in time domain, or add, to the PUSCH for sending, all or some of UCI corresponding to some of the PUCCHs that overlap the PUSCH in time domain.

In an optional design, the first condition in step 23 may be any one of the foregoing conditions a1 to a7, a9, b1 to b3, and c1 to c3. Alternatively, the first condition is that a value of the beta-offset indicator in the DCI is a fifth value, the fifth value is used to instruct the terminal device to add a part of the UCI to the PUSCH, and the fifth value may be configured by the network device for the terminal device by using signaling. In addition, the fifth value may be the same as or different from the fourth value.

A possible implementation in which the terminal device adds, to the PUSCH for sending, all UCI carried on some of the PUCCHs that overlap the PUSCH in time domain is listed. If the UCI on some of the PUCCHs does not meet b1 or b3, the terminal device may send, on the PUSCH, the UCI on the some PUCCHs that does not meet b1 or b3. For example, the terminal device may determine UCI that has a smallest payload size in the plurality of pieces of UCI, determine whether the UCI meets the foregoing condition b1 or b3, and if the UCI does not meet the foregoing condition b1 or b3, determine that the terminal device may send the UCI that has the smallest payload on the PUSCH. Optionally, the terminal device may further determine whether a sum of a payload size of UCI that has the second smallest payload size and a payload size of UCI that has the smallest payload size meets the foregoing condition b1 or b3, and if the sum does not meet the foregoing condition b1 or b3, the terminal device determines that the terminal device may send the UCI that has the smallest payload size and the UCI that has the second smallest payload size on the PUSCH, and so on, until a plurality of pieces of UCI that has the smallest payload size does not meet the foregoing condition b1 or b3. In the foregoing technical solution, as much UCI as possible can be sent on the PUSCH while transmission reliability of the uplink data is ensured. Therefore, a transmission resource can be fully used, and the UCI can be sent in a timely manner. This improves efficiency of communication between the terminal device and the network device.

In an optional design, before step 23, the method further includes the following steps:

The network device sends instruction information, where the instruction information instructs to add the part of the UCI to the PUSCH. The network device may send the instruction information to the terminal device when determining that the requirement on transmission reliability of the uplink data carried on the PUSCH is relatively high.

In addition, the terminal device receives the instruction information.

In this case, the first condition in step 23 is that the instruction information received by the terminal device instructs to add the part of the UCI to the PUSCH. A specific form of the part of the UCI may be predefined, or may be configured by using RRC signaling, or may be indicated by a MAC CE, DCI sent by the network device, or the instruction information.

In the foregoing technical solution, the network device may send, to the terminal device, the instruction information instructing to carry only the part of the UCI on the PUSCH. The terminal device sends, based on the instruction information, only the part of the UCI on the PUSCH, thereby ensuring transmission reliability of the uplink data.

In an optional design, the part of the UCI in step 23 may be determined based on a quantity of first information bits and priorities of various types of information included in the UCI, and the following procedure may be included.

First, the terminal device determines a sending priority of the UCI. It may be assumed that HARQ>CSI part 1>CSI part 2 in priority. When a quantity of information bits of the HARQ is greater than that of the first information bits, it may be selected that none of the information bits of the HARQ is sent, or the HARQ is sent on a truncated resource of the PUCCH. When a quantity of information bits of the HARQ is less than or equal to that of the first information bits, but a quantity of information bits of the CSI part 1+the HARQ is greater than that of the first information bits, the HARQ is added but the CSI part 1 is not carried on the PUSCH, and the CSI part 1 may not be sent, or the CSI part 1 may be sent on a truncated resource of the PUCCH. When a quantity of information bits of the HARQ+the CSI part 1 is less than or equal to that of the first information bits, but a quantity of information bits of the CSI part 2+the CSI part 1+the HARQ is greater than that of the first information bits, the HARQ and the CSI part 1 are added but the CSI part 2 is not carried on the PUSCH, and the CSI part 2 may not be sent, or the CSI part 2 may be sent on a truncated resource of the PUCCH. The quantity of the first information bits may be predefined, or may be configured by using RRC signaling, or may be indicated by a MAC CE or DCI sent by the network device.

According to the foregoing technical solution, UCI that has relatively small impact on transmission reliability of the uplink data and has a relatively high priority can be effectively determined, and the UCI is piggybacked on the PUSCH, so that efficiency and reliability of communication between the network device and the terminal device are both considered.

In an optional design, if the first condition is met, the terminal device discards the remaining part, of the UCI, that is not sent on the PUSCH. It should be understood that when the time domain resource of the PUSCH overlaps the time domain resources of the plurality of PUCCHs, the terminal device may discard parts of UCI that are carried on all the PUCCHs of which the time domain resources overlap the time domain resource of the PUSCH and that are not sent on the PUSCH.

In an optional design, after step 22, the method further includes the following steps.

If the first condition is met, and the HARQ or the A-CSI in the UCI is piggybacked on the PUSCH, the terminal device sends a remaining part of the UCI on a truncated resource of the PUCCH. The remaining part of the UCI refers to content that is of the UCI and that is not sent on the PUSCH.

Figure 8:
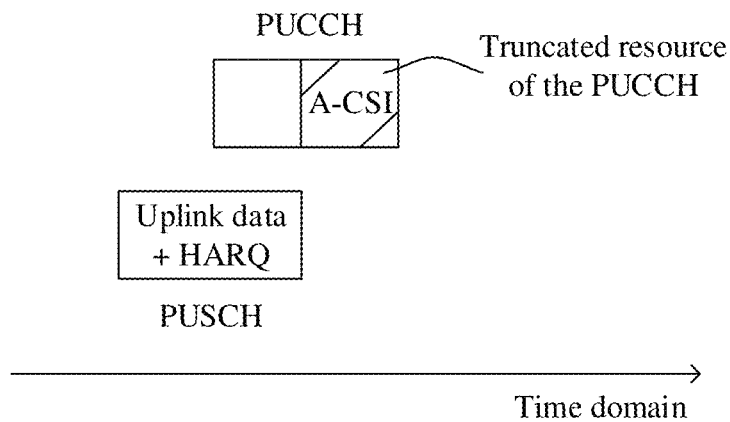
FIG. 8 is a schematic diagram of transmitting different parts of UCI according to an embodiment of this application.

In addition, the network device receives the remaining part that is of the UCI and that is sent on the truncated resource of the PUCCH. For example, referring to FIG. 8, the terminal device sends the uplink data and the HARQ that is in the UCI on the PUSCH, and sends the A-CSI on the truncated resource of the PUCCH.

In the foregoing technical solution, the terminal device may send the remaining part of the UCI on the truncated resource of the PUCCH, based on sending of only the part of the UCI on the PUSCH, while ensuring a requirement on transmission reliability of the uplink data. In this way, the terminal device not only can fully use a transmission resource, but also can send all content of the UCI in a timely manner, thereby improving efficiency of communication with the network device.

It should be understood that when the time domain resource of the PUSCH overlaps the time domain resources of the plurality of PUCCHs, the terminal device may send, on truncated resources of all or some of the PUCCHs that overlap the PUSCH in time domain, parts of the UCI that are on the PUCCHs and that are not sent on the PUSCH.

Figure 9:
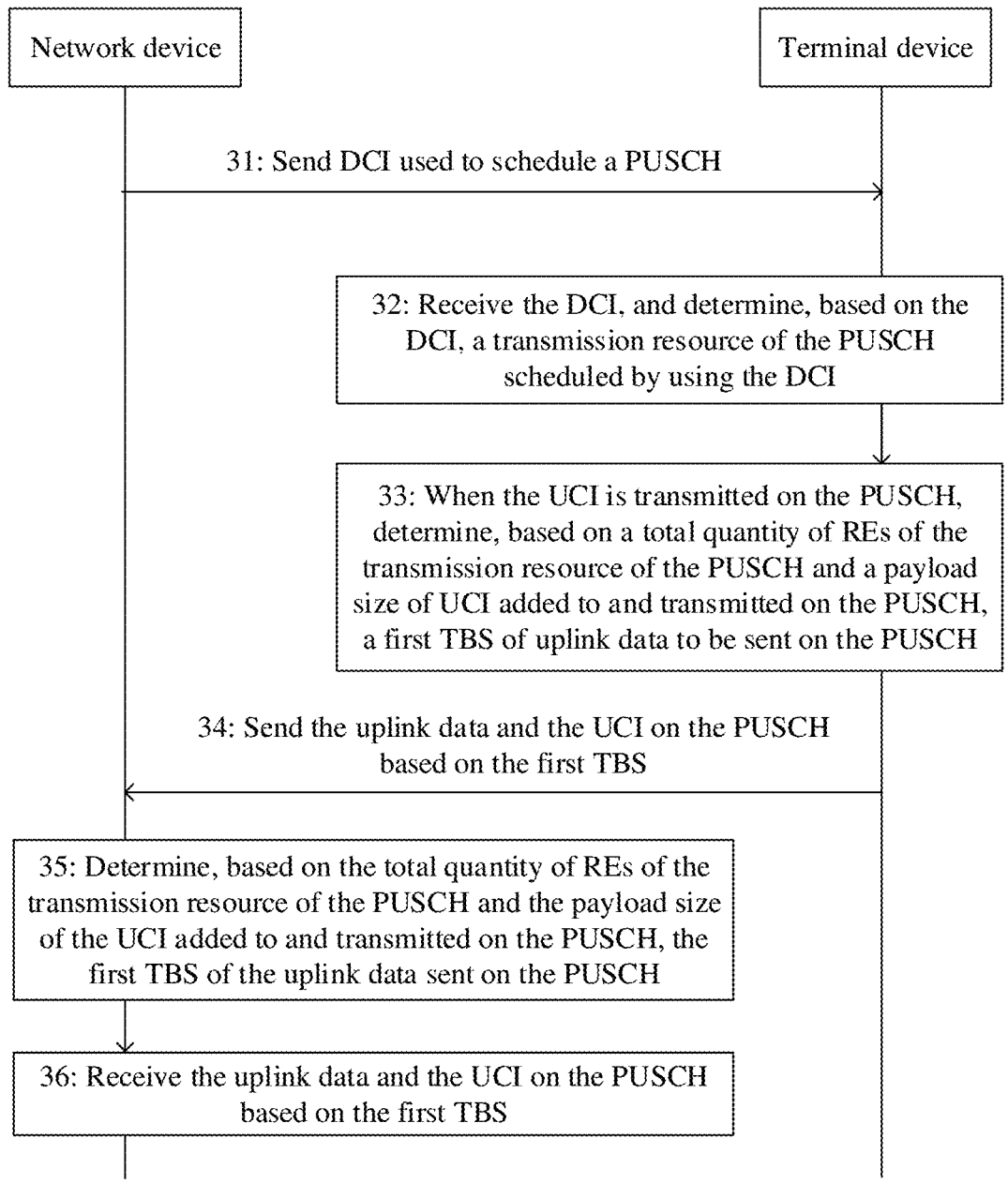
FIG. 9 is a schematic flowchart of another uplink information transmission method according to an embodiment of this application.

FIG. 9 shows another uplink information transmission method according to an embodiment of this application. The method includes following steps.

Step 31: A network device sends DCI, where the DCI is used to schedule a PUSCH.

Step 32: The terminal device receives the DCI sent by the network device, and determines, based on the DCI, a transmission resource of the PUSCH scheduled by using the DCI.

Step 33: When the UCI is transmitted on the PUSCH, the terminal device determines, based on a total quantity of REs of the transmission resource of the PUSCH and a payload size of the UCI carried on the PUSCH, a first TBS of uplink data to be sent on the PUSCH. The UCI may be to-be-transmitted UCI carried on a PUCCH of which a time domain resource overlaps a time domain resource of the PUSCH, or may be the UCI scheduled by the network device and carried by the PUSCH.

Step 34: The terminal device sends the uplink data and the UCI on the PUSCH based on the first TBS, where a TBS of the uplink data sent on the PUSCH is the first TBS.

Step 35: The network device determines, based on the total quantity of REs of the transmission resource of the PUSCH and the payload size of the UCI carried on the PUSCH, the first TBS of the uplink data sent on the PUSCH. A manner in which the network device determines the first TBS in step 35 may be the same as the manner in which the terminal device determines the first TBS in step 33.

Step 36: The network device receives the uplink data and the UCI on the PUSCH based on the first TBS.

It should be understood that step 35 may be performed at a moment after step 31 is performed, for example, step 35 may be performed before step 34, or may be performed before step 32 or step 33, or may be performed after step 34.

In the prior art, when UCI is transmitted on the PUSCH, a terminal device increases an encoding rate of uplink data, so that when a transmission resource of the PUSCH is occupied by the UCI, the terminal device continues to send all uplink data that is determined without considering adding the UCI. Compared with the prior art, in the technical solutions provided in this application, the TBS of the sent uplink data is determined with reference to occupation of a PUSCH resource by the UCI. This avoids a case in which transmission reliability of the uplink data is reduced due to an excessively large amount of the sent uplink data.

Figure 10:
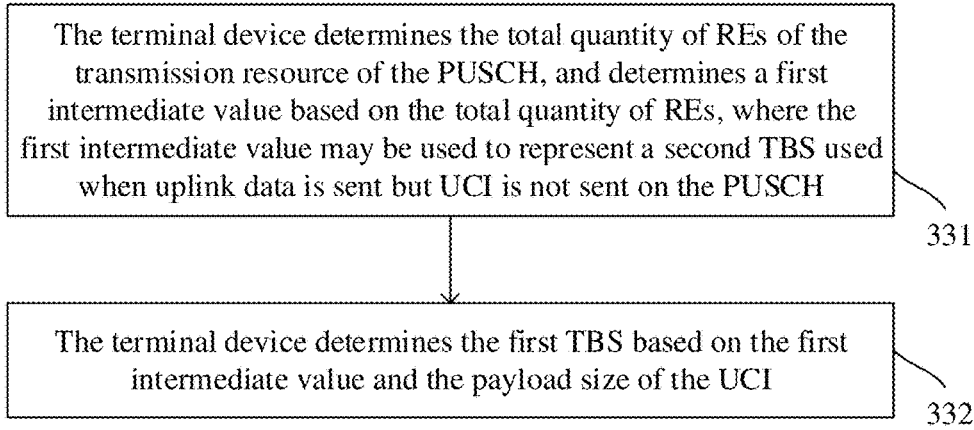
FIG. 10 is a schematic flowchart of determining a first TBS in an uplink information transmission method.

In an optional design, referring to FIG. 10, in step 33, that the terminal device determines, based on the total quantity of REs of the transmission resource of the PUSCH and the payload size of the UCI carried on the PUSCH, the first TBS of the uplink data to be sent on the PUSCH may be specifically the following steps.

Step 331: The terminal device determines the total quantity of REs of the transmission resource of the PUSCH, and determines a first intermediate value based on the total quantity of REs, where the first intermediate value may be used to represent a second TBS used when uplink data is sent but UCI is not sent on the PUSCH. For a manner of determining the total quantity of REs of the transmission resource of the PUSCH, refer to various existing technical means. The first intermediate value may be an intermediate quantity $N_{info}$ used to determine the second TBS. For example, $N_{info}=N_{RE} \cdot R \cdot Q \cdot v$. In the formula, $N_{RE}$ is the total quantity of REs of the transmission resource of the PUSCH, R, Q, and v are respectively a target encoding rate, a modulation order, and a transport layer quantity of the PUSCH transmission. The second TBS may be determined by performing quantization and/or table lookup processing on the first intermediate value. It should be noted that the first intermediate value may alternatively be a second TBS obtained by performing quantization and/or table lookup processing on the intermediate quantity $N_{info}$.

For a quantization and/or table lookup process in this embodiment of this application, refer to step (2), step (3), and step (4) in the protocol TS 38.214 vf.0.0 Section 5.1.3.2, or the foregoing process may be simplified or improved.

Step 332: The terminal device determines the first TBS based on the first intermediate value and the payload size of the UCI.

Step 332 may be implemented in a plurality of manners, including but not limited to:

Manner 1: The terminal device determines, based on the first intermediate value and the payload size of the UCI, the quantity of REs occupied when the UCI is sent on the PUSCH, and determines the first TBS based on a quantity of remaining REs obtained by subtracting the quantity of REs occupied when the UCI is transmitted on the PUSCH from the total quantity of REs.

A quantity of coded modulation symbols at each layer that are occupied by the UCI when the UCI is transmitted on the PUSCH is equal to the quantity of REs occupied when the UCI is sent on the PUSCH. Therefore, the quantity of coded modulation symbols at each layer that are occupied by the UCI when the UCI is transmitted on the PUSCH may be calculated, and is used as the quantity of REs occupied when the UCI is sent on the PUSCH.

For example, a quantity of REs occupied by a HARQ may be:

$$Q'_{ACK} = \min\left\{\left\lceil\frac{(O_{ACK}+L)M_{sc}^{PUSCH} \cdot N_{symb}^{PUSCH} \cdot \beta_{offset}^{PUSCH}}{N_{info}}\right\rceil, (M_{sc}^{PUSCH} \cdot N_{symb}^{PUSCH} - M_{sc}^{PTRS} \cdot N_{symb}^{PTRS})\right\}. \quad (1)$$

A quantity of REs occupied by a CSI part 1 may be:

$$Q'_{CSI,1} = \min\left\{\left\lceil\frac{(O_{CSI,1}+L)M_{sc}^{PUSCH} \cdot N_{symb}^{PUSCH} \cdot \beta_{offset}^{PUSCH}}{N_{info}}\right\rceil, (M_{sc}^{PUSCH} \cdot N_{symb}^{PUSCH} - M_{sc}^{PTRS} \cdot N_{symb}^{PTRS} - Q'_{ACK})\right\}. \quad (2)$$

A quantity of REs occupied by a CSI part 2 may be:

$$Q'_{CSI,2} = \min\left\{\left\lceil\frac{(O_{CSI,2}+L)M_{sc}^{PUSCH} \cdot N_{symb}^{PUSCH} \cdot \beta_{offset}^{PUSCH}}{N_{info}}\right\rceil, (M_{sc}^{PUSCH} \cdot N_{symb}^{PUSCH} - M_{sc}^{PTRS} \cdot N_{symb}^{PTRS} - Q'_{ACK} - Q'_{CSI,1})\right\}. \quad (3)$$

In the foregoing formulas, $O_{ACK}$ and L respectively represent a quantity of original information bits of the HARQ and a quantity of check bits to perform CRC, $O_{CSI}$ represents a quantity of information bits of A-CSI carried on the PUSCH, and $M_{sc}^{PUSCH}$ and $N_{symb}^{PUSCH}$ respectively represent a quantity of frequency domain subcarriers and a quantity of time domain symbols included in a PUSCH resource. The quantity of symbols herein is a quantity of symbols obtained after symbols occupied by a demodulation reference signal (DMRS) are removed, and $M_{sc}^{PTRS}$ and $N_{symb}^{PTRS}$ respectively represent a quantity of subcarriers and a quantity of symbols occupied by a phase tracking reference signal (PT-RS). In formula (1), $\beta_{offset}^{PUSCH}$ indicates an MCS offset beta-offset that the HARQ has when the HARQ is transmitted on the PUSCH, and when uplink data is carried on the PUSCH, a value is $\beta_{offset}^{PUSCH} = \beta_{offset}^{ACK/NACK}$. In formula (2), $\beta_{offset}^{PUSCH}$ indicates an MCS offset beta-offset that the CSI part 1 has when the CSI part 1 is transmitted on the PUSCH, and a value is $\beta_{offset}^{PUSCH} = \beta_{offset}^{ACK/NACK}/\beta_{offset}^{CSI\ part\ 1}$. $\beta_{offset}^{ACK/NACK}$ and $\beta_{offset}^{CSI\ part\ 1}$ are configured by using higher layer signaling or indicated by DCI sent by the network device. $O_{CSI,1}$ and L respectively represent a quantity of original information bits of the CSI part 1 and a quantity of check bits to perform CRC, and meanings of $M_{sc}^{PUSCH}$, $N_{symb}^{PUSCH}$, $M_{sc}^{PTRS}$, and $N_{symb}^{PTRS}$ are the same as those described above. $O_{CSI,2}$ and L respectively represent a quantity of original information bits of the CSI part 2 and a quantity of check bits to perform CRC, and meanings of $M_{sc}^{PUSCH}$, $N_{symb}^{PUSCH}$, $M_{sc}^{PTRS}$, and $N_{symb}^{PTRS}$ are the same as those described above. In formula (3), $\beta_{offset}^{PUSCH}$ indicates an MCS offset beta-offset that the CSI part 2 has when the CSI part 2 is transmitted on the PUSCH. In this case, a value is $\beta_{offset}^{PUSCH} = \beta_{offset}^{CSI\ part\ 2}$. It should be understood that, in the formula, $O_{ACK}$, $O_{CSI,1}$, and $O_{CSI,2}$ may be 0, indicating that no corresponding UCI needs to be carried on the PUSCH.

It should be understood that, when the UCI includes a plurality of types of UCI, the quantity of REs occupied when the UCI is sent on the PUSCH is a sum of quantities of REs occupied by all types of the UCI, and is marked as $Q'_{UCI}$. In this case, a quantity of remaining REs obtained by subtracting the quantity of REs occupied when the UCI is transmitted on the PUSCH from the total quantity of REs is $\overline{N}_{RE}=N_{RE}-Q'_{UCI}$. A manner of determining the first TBS based on the quantity of remaining REs may be: performing quantization and/or table lookup processing based on a second intermediate value $\overline{N}_{info}=\overline{N}_{RE} \cdot R \cdot Q \cdot v$ to determine the first TBS.

Manner 2: The terminal device determines, based on the first intermediate value and the payload size of the UCI, the quantity of REs occupied when the UCI is sent on the PUSCH, and determines a third intermediate value based on the quantity of REs occupied when the UCI is sent on the PUSCH, where the third intermediate value is used to represent a quantity of information bits that can be carried, where the quantity of information bits is determined by using the quantity of REs occupied when the UCI is carried on the PUSCH and by using a specified modulation and coding scheme and transmission scheme. A possible calculation manner of the third intermediate value is $Q_{UCI}=Q'_{UCI} \cdot R \cdot Q \cdot v$. Another possible calculation manner of the third intermediate value is $Q_{UCI}=Q'_{ACK}*R*Q*v+Q'_{CSI,1}*R*Q*v+Q'_{CSI,2}*R*Q*v$. Then, the first TBS is determined based on the first intermediate value and the third intermediate value. For example, the first TBS may be determined by performing quantization and/or table lookup based on a difference $N_{info}$-QCI between the first intermediate value and the third intermediate value.

In the foregoing plurality of implementations, the terminal device may determine the TBS of the sent uplink data with reference to occupation of a PUSCH resource by the UCI. This avoids a case in which transmission reliability of the uplink data is reduced due to an excessively large amount of the sent uplink data.

In an optional design, in step 33, that the terminal device determines, based on the total quantity of REs of the transmission resource of the PUSCH and the payload size of the UCI carried on the PUSCH, the first TBS of the uplink data sent on the PUSCH may be specifically:

determining the first TBS based on the first intermediate value and the payload size of the UCI, where the first intermediate value and the total quantity of REs meet a first function relationship. For example, the first function relationship between the first intermediate value $N_{info}$ and the total quantity $N_{RE}$ of REs may be: $N_{info}=f_1[g_1(N_{RE}) \cdot R \cdot Q \cdot v]$. R, Q, and v are respectively a target encoding rate, a modulation order, and a transport layer quantity of the PUSCH transmission. $g_1(N_{RE})$ indicates that potential quantization processing is performed on the total quantity of REs, and in a possible implementation, quantization processing is not performed, that is, $g_1(N_{RE})=N_{RE}$. $f_1(x)$ indicates that potential quantization (including table lookup) processing is performed on an input variable x, and in a possible implementation, no quantization processing is performed, that is, $f_1(x)=x$. Optionally, the first intermediate value is used to represent a second TBS used when uplink data is sent but UCI is not sent on the PUSCH.

Optionally, the determining the first TBS based on the first intermediate value and the payload size of the UCI may include the following step: determining the first TBS based on a quantity of remaining REs obtained by subtracting the quantity of REs occupied when the UCI is transmitted on the PUSCH from the total quantity of REs, where the quantity of REs occupied when the UCI is sent on the PUSCH, the first intermediate value, and the payload size of the UCI meet a second function relationship.

The second function relationship between the quantity $Q_{UCI}'$ of REs occupied when the UCI is sent on the PUSCH and the first intermediate value $N_{info}$ is: $Q_{UCI}'=Q_{ACK}'+Q_{CSI,1}'+Q_{CSI,2}'$. $Q_{ACK}'$, $Q_{CSI,1}'$, and $Q_{CSI,2}'$ are respectively a quantity of REs occupied by the HARQ, a quantity of REs occupied by the CSI part 1, and a quantity of REs occupied by the CSI part 2 in the PUSCH transmission. For a calculation method of $Q_{ACK}'$, $Q_{CSI,1}'$, and $Q_{CSI,2}'$, refer to the foregoing description.

Optionally, the determining the first TBS based on the first intermediate value and the payload size of the UCI may include the following step: determining the first TBS based on the first intermediate value and the second intermediate value, where the second intermediate value and the quantity of REs occupied when the UCI is sent on the PUSCH meet a third function relationship, and the quantity of REs occupied when the UCI is sent on the PUSCH, the first intermediate value, and the payload size of the UCI meet a fourth function relationship. For the fourth function relationship, refer to the second function relationship. The fourth function relationship and the second function relationship are the same. The third function relationship between the second intermediate value $\overline{N}_{info}$ and the quantity $Q_{UCI}'$ of REs occupied when the UCI is sent on the PUSCH is $\overline{N}_{info}=f_2[g_2(Q_{UCI}') \cdot R \cdot Q \cdot v]g_2(N_{RE})$ indicates that potential quantization processing is performed on the total quantity of REs, and in a possible implementation, quantization processing is not performed, that is, $g_2(N_{RE})=N_{RE}$. $f_2(x)$ indicates that potential quantization (including table lookup) processing is performed on an input variable x, and in a possible implementation, no quantization processing is performed, that is, $f_2(x)=x$.

In the foregoing plurality of optional designs, the TBS of the sent uplink data is determined with reference to occupation of a PUSCH resource by the UCI. This avoids a case in which transmission reliability of the uplink data is reduced due to an excessively large amount of the sent uplink data.

Although the foregoing method embodiment is described from a perspective of scheduling-based uplink data transmission, a design idea of this application may also be applied to grant-free uplink data transmission.

The uplink grant-free transmission (uplink data transmission without grant) is an "arrive-and-go" uplink data sending method. To be specific, when data arrives, the terminal device does not need to send a scheduling request (SR) to the network device, and does not need to wait for a grant sent by the network device, instead, directly sends the data to the network device by using a resource pre-allocated by the network device and a specified transmission parameter. Grant-free is also referred to as configured grant (CG). Compared with a conventional "request-grant"-based uplink data transmission method, signaling overheads can be effectively reduced in the uplink grant-free transmission because the network device does not need to send a grant, and a data transmission delay can be significantly reduced in the uplink grant-free transmission because a grant of the network device does not need to be waited for. The uplink grant-free transmission may be applied to transmission of a burst and delay-sensitive small data packet.

To enable the terminal device to transmit the uplink data by using the uplink grant-free transmission method, the network device needs to pre-allocate, to the terminal device, a transmission resource (which is referred to as a grant-free transmission resource below) that is required for sending data in a grant-free manner. Parameters of the grant-free transmission resource include a period P, an offset parameter of a time domain resource, time domain resource allocation, frequency domain resource allocation, UE-specific demodulation reference signal configuration information, an MCS, a quantity of repetitions, a power control parameter, and a redundancy version (RV) sequence.

Based on different resource configuration methods, the uplink grant-free transmission may be classified into two types: a configured grant type 1 and a configured grant type 2. A difference between the two types lies in that for the configured grant type 1, only radio resource control (RRC) signaling is used to configure a grant-free resource, and downlink control information (DCI) does not need to be used to configure a resource; and for the configured grant type 2, RRC signaling and DCI are used to configure a grant-free resource. The RRC signaling may be used to configure the RV sequence and the period P, and the DCI may be used to activate/deactivate the grant-free transmission and configure a time-frequency domain resource of the grant-free transmission. The terminal device can use the configured grant-free transmission resource only after receiving the DCI.

A channel used by the terminal device to perform grant-free transmission is a PUSCH, and RRC signaling needs to be used in configuration of a grant-free transmission resource. Therefore, a channel used by the terminal device to send data in a grant-free manner is referred to as a higher layer configured PUSCH, or may be referred to as a configured grant PUSCH (CG PUSCH), and the grant-free transmission is referred to as higher layer configured transmission.

In 5G NR, a grant-free resource allocated to a terminal device may be K transmission occasions (TO) configured in one period P, and a size of a time domain resource occupied by the K TOs is less than or equal to a size of a time domain resource in the period P. A time unit of the period P may be a slot, or may be a time domain symbol, or may be a subframe or a radio frame. Each TO may be used for one transmission of a transmission block (TB), and the K TOs in the period P may be used for a maximum of K times of transmission of the TB. Because only one TB is transmitted in one period P, the corresponding K times of transmission of the TB are also referred to as K repetitions of the TB. Different times of transmission of the TB may use a same redundancy version, or may use different redundancy versions. An RV used when the terminal device sends the TB once by using a TO is determined by an index of the TO in a period. Specifically, an RV used by an $n^{th}$ TO in the period P is an $(mod(n-1, 4)+1)^{th}$ RV in a configured RV sequence, and mod indicates a modulo operation, where $1 \leq n \leq K$. A size of a time domain resource occupied by one TO is determined based on a time domain resource allocation parameter.

Figure 10A:
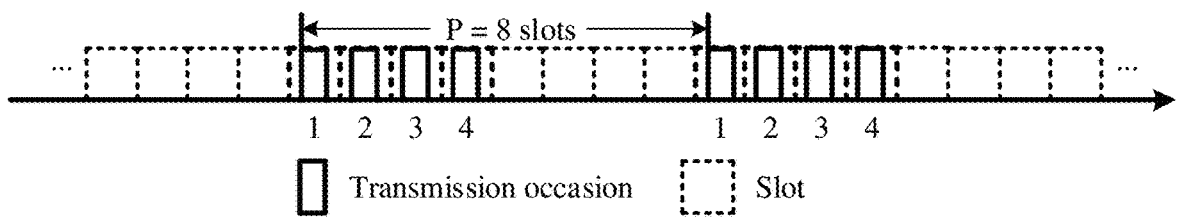
FIG. 10A is a schematic diagram of a slot-based TO configuration.
Figure 10B:
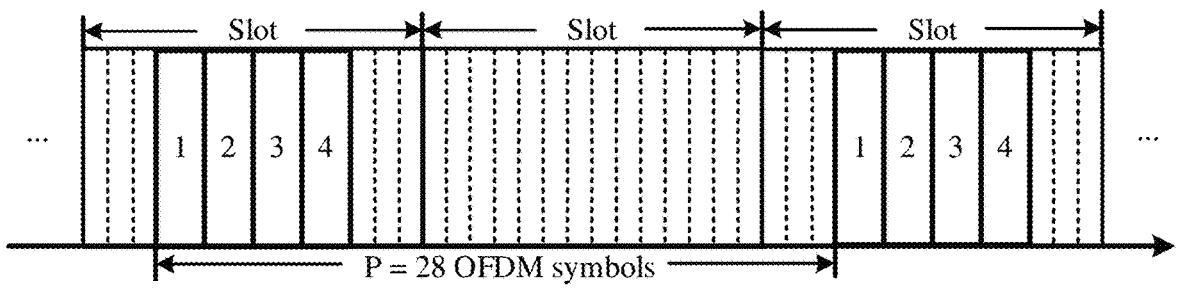
FIG. 10B is a schematic diagram of a non-slot-based TO configuration.

5G NR supports two TO configurations. One TO configuration may be referred to as a slot-based TO configuration, that is, one slot includes a maximum of one TO. As shown in FIG. 10A, P is eight slots, and K is 4. The other configuration may be referred to as a non-slot-based TO configuration. To be specific, one slot may include a plurality of TOs. As shown in FIG. 10B, P is two slots, namely, 28 time domain symbols, K is 4, and each TO occupies two time domain symbols. A time domain symbol in this application may be an orthogonal frequency division multiplexing (OFDM) symbol or a discrete fourier transform spread orthogonal frequency division multiplexing (DFT-s-OFDM) symbol.

When the terminal device needs to send a data packet to the network device, the terminal device repeatedly transmits, according to the following rules, grant-free data by using a TO configured by the network device: (1) When a configured RV sequence is {0, 2, 3, 1}, initial transmission of the data packet may start on the first TO in the period P; (2) when a configured RV sequence is {0, 3, 0, 3}, initial transmission of the data packet may start on a TO associated with the RV 0 in the period P; (3) when a configured RV sequence is {0, 0, 0, 0}, if K is equal to 8, initial transmission of the data packet may start on another TO different from the last TO in the period P, or if a value of K is 1, 2, or 4, initial transmission of the data packet may start on all K TOs in the period P; and (4) for any RV sequence, when one of the following conditions is met, transmission of the data packet is terminated: a quantity of transmission times reaches K, or sending of the data packet on the last TO in the K TOs in the period P is completed.

When sending the data packet according to the foregoing rule, the terminal device may repeatedly transmit the data packet by using a maximum of K TOs in the period P, and a HARQ process identifier used for sending the data packet may be calculated based on a start symbol index of the first TO of the K TOs in the period. In this way, even if the network device cannot detect all repeated transmission of the data packet due to a reason such as channel fading, the network device may determine the unique HARQ process identifier based on a start symbol of the first TO of the K TOs in the period in which any repetition is detected. This does not cause a case in which data confusion occurs because the terminal device and the network device have different understandings of the HARQ process identifier.

The terminal device may send uplink control information (UCI) in two manners. One manner is to carry the UCI on a PUCCH, and send the UCI by using a PUCCH resource.

The other manner is to carry the UCI on a PUSCH, and send the UCI by using a PUSCH resource.

When the terminal device transmits data in a grant-free manner by using a semi-persistent grant-free resource configured by the network device, a relatively high requirement is imposed on both a latency and reliability of data transmission. When a transmission resource of the UCI partially or completely overlaps a transmission resource of grant-free data in time domain, sending the UCI in an overlapping area affects reliability of grant-free data transmission. When the transmission resource of the UCI partially or completely overlaps the transmission resource of the grant-free data in time domain, if the UCI is always not sent in the overlapping area, downlink data transmission of the terminal device is affected. Therefore, a technical problem that needs to be resolved is to minimize impact of UCI transmission on reliability of grant-free data transmission when the transmission resource of the UCI partially or completely overlaps the transmission resource of the grant-free data in time domain.

Figure 10C:
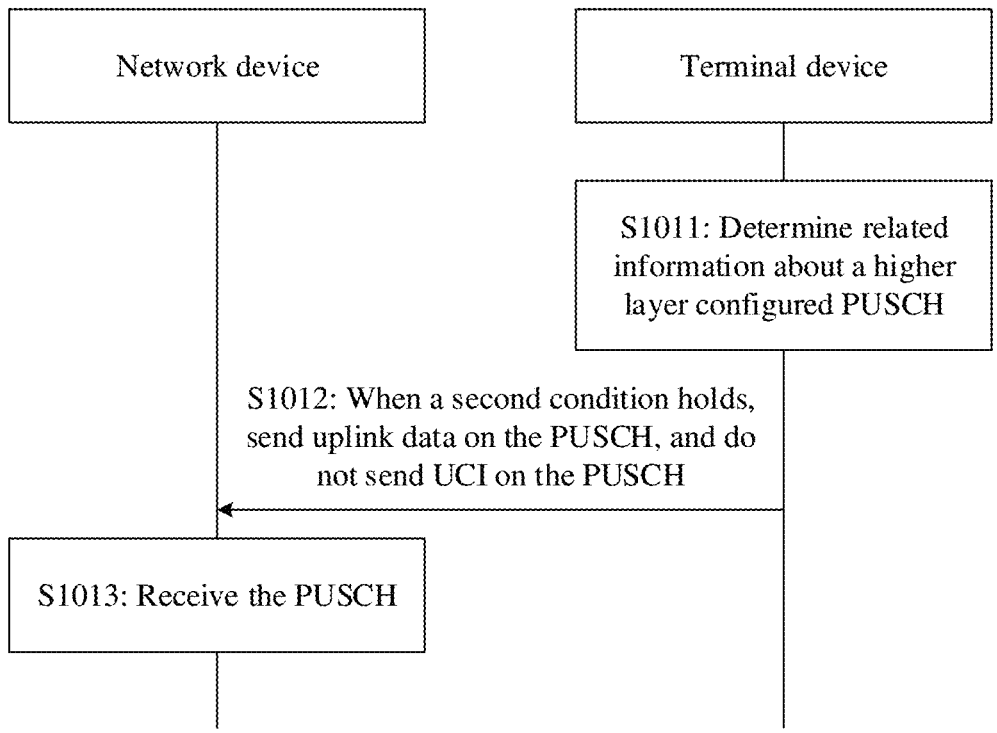
FIG. 10C is a schematic flowchart of an uplink information transmission method according to an embodiment of this application.

In the embodiments of this application, when the transmission resource of the UCI partially or completely overlaps the transmission resource of the higher layer configured PUSCH in time domain, a method for determining whether the terminal device sends the UCI on the PUSCH is provided. FIG. 10C is a schematic flowchart of an uplink information transmission method according to an embodiment of this application.

S1011: A terminal device determines information about a higher layer configured PUSCH.

Specifically, the information about the higher layer configured PUSCH includes at least one of an RV sequence used during higher layer configured PUSCH transmission, a period P, a quantity K of TOs in the period P, and an MCS used during the higher layer configured PUSCH transmission. The "at least one" herein means any one of the foregoing listed information, or a combination of any two pieces of information, or a combination of any of more than two pieces of information.

Optionally, the method for determining, by the terminal device, the information about the higher layer configured PUSCH includes: for the configured grant type 1, receiving, by the terminal device, RRC signaling that is from the network device and that is used to configure the PUSCH, and determining, based on the received RRC signaling, the information about the higher layer configured PUSCH; for the configured grant type 2, receiving, by the terminal device from the network device, RRC signaling that is used to configure the PUSCH, and determining, based on the received RRC signaling, an RV sequence, a period P, and a quantity K of TOs in the period P that are used during the higher layer configured PUSCH transmission; and for the configured grant type 2, receiving, by the terminal device, DCI from the network device, and determining, based on the received DCI, an MCS used during the higher layer configured PUSCH transmission.

Further, the terminal device may determine, based on the period P, the quantity K of TOs in the period P, and a time domain location at which the higher layer configured PUSCH transmission is located, a number n ($1 \leq n \leq K$) of a TO used during the higher layer configured PUSCH transmission in the K TOs in the period. The terminal device may determine, based on the number n of the TO and the RV sequence, the RV used by the $n^{th}$ TO. The terminal device may determine, based on the MCS used during the higher layer configured PUSCH transmission, a bit rate used during the higher layer configured PUSCH transmission.

S1012: When the second condition is met, the terminal device sends uplink data to the network device on the higher layer configured PUSCH, and does not send UCI on the higher layer configured PUSCH. A transmission resource of the UCI partially or completely overlaps a transmission resource of the higher layer configured PUSCH in time domain. In this embodiment of this application, the UCI may be sent on the PUSCH in two different implementations. In one implementation, the UCI is transmitted on the transmission resource of the PUSCH, and PUSCH data mapped to the transmission resource used by the UCI is punctured. In the other implementation, the UCI is transmitted on the transmission resource of the PUSCH, and PUSCH data is mapped to a resource different from the transmission resource used by the UCI.

Specially, the second condition may be any one of the following conditions.

(1) The RV used by the higher layer configured PUSCH transmission is 0 or 3. When a value of the RV is 0 or 3, a success rate of decoding the data transmitted on the TO this time is relatively high, and reliability of data transmission when the value of the RV is 0 or 3 should be preferentially ensured. Therefore, the UCI is not sent on the higher layer configured PUSCH that corresponds to the value of the RV being 0 or 3.

(2) The number n of the TO used during the higher layer configured PUSCH transmission in all the TOs in the period is greater than or equal to a threshold $K_1$. Optionally, the terminal device determines the threshold $K_1$ based on the quantity K of TOs in the period P. For example, $K_1$=ceil(K/2), and ceil represents a rounding down operation.

(3) An encoding rate R used during the higher layer configured PUSCH transmission is greater than or equal to a threshold $R_1$. The encoding rate may be an encoding rate indicated by the network device by using signaling, may be an encoding rate determined by the terminal device based on a transport block size and a size of a time-frequency domain resource used during the higher layer configured PUSCH transmission, or may be an encoding rate obtained after HARQ combination. The threshold $R_1$ may be specified in a protocol, or may be indicated by the network device to the terminal device by using RRC signaling, DCI, or a MAC CE. When the encoding rate R is greater than or equal to the threshold $R_1$, for example, a value of $R_1$ may be 0.3, it indicates that an encoding rate of current data transmission is already relatively high. If the UCI further uses a part of the PUSCH transmission resource, transmission quality of the PUSCH further deteriorates. Therefore, to improve reliability of PUSCH transmission, when the encoding rate R is greater than or equal to the threshold $R_1$, the UCI is not transmitted on the higher layer configured PUSCH.

(4) A quantity $n_2$ of transmission times of the TB in the higher layer configured PUSCH transmission is less than or equal to a threshold $K_2$. Herein, the quantity $n_2$ of transmission times is used to represent that transmission of the TB on a current TO is the $(n_2)^{th}$ time of transmission of the TB. Optionally, the terminal device may determine the threshold $K_2$ based on the quantity K of TOs in the period P. For example, $K_2$=ceil(K/2). For the first $K_2$ times of transmission of the TB in the period P, a quantity of times of transmission of the TB is relatively small. To reduce a transmission delay of the TB, and enable the TB to be correctly decoded by the network device in a time as short as possible, UCI is prevented from occupying a transmission resource of the higher layer configured PUSCH. When there is TB transmission undetected by the network device, the network device has an understanding that a quantity of transmission times of the TB is inconsistent with an actual quantity of transmission times of the TB. Consequently, a determining result of the network device for the second condition is inconsistent with that of the terminal device, and further, the network device incorrectly determines whether the UCI is transmitted on the PUSCH. To avoid the foregoing incorrect determining, when the UCI is transmitted on the PUSCH, the terminal device may send, to the network device, indication information used to indicate that the UCI is transmitted on the PUSCH. Specifically, different reference signals may be used to indicate whether the UCI is transmitted on the PUSCH. For example, if the network device receives a first reference signal, it indicates that no UCI is transmitted on the PUSCH. If the network device receives a second reference signal, it indicates that the UCI is transmitted on the PUSCH. Reference signal sequences used by the first reference signal and the second reference signal are different.

(5) When transmission of the UCI is triggered by DCI sent by the network device, a quantity $n_3$ of symbols from the last time domain symbol occupied by the DCI to the first symbol of a time domain resource of the UCI that overlaps a time domain resource of the higher layer configured PUSCH is less than or equal to a threshold $K_3$. Optionally, the threshold $K_3$ may be specified in a protocol, or may be indicated by the network device to the terminal device by using RRC signaling, DCI, or a MAC CE. For example, $K_3$ may be equal to a PUSCH preparation time.

(6) An MCS table corresponding to the PUSCH is the first MCS table. Specifically, the first MCS table may be one or more of a plurality of MCS tables that are configured by using higher layer signaling and that are used for transmission of uplink data, and spectral efficiency corresponding to an MCS index having lowest spectral efficiency in the first MCS table is the lowest in the plurality of MCS tables. Optionally, when a value of a first parameter corresponding to the PUSCH is a first preset value, for example, a value of an RRC parameter "mcs-table" in an NR protocol is "qam64LowSE", the MCS table corresponding to the PUSCH is the first MCS table.

S1013: The network device receives the higher layer configured PUSCH from the terminal device. When the second condition is met, the UCI is not carried on the higher layer configured PUSCH.

The method for determining the first TBS on the PUSCH in FIG. 9 and FIG. 10 is also applicable to the higher layer configured PUSCH. It may be understood that for the higher layer configured PUSCH, steps 31 and 32 are not required. For a method for determining the TBS in the higher layer configured PUSCH transmission, refer to FIG. 9 and FIG. 10. Details are not described herein again.

Figure 11:
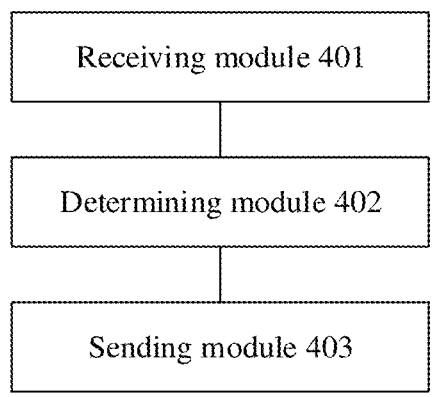
FIG. 11 is a schematic diagram of a communications apparatus according to an embodiment of this application.

FIG. 11 shows a communications apparatus. The communications apparatus may be a terminal device, or may be a chip applied to a terminal device. The communications apparatus includes a receiving module 401, a determining module 402, and a sending module 403. The receiving module 401 is configured to receive downlink control information DCI. The determining module 402 is configured to determine, based on the DCI, a transmission resource of a physical uplink shared channel PUSCH scheduled by using the DCI, where the transmission resource of the PUSCH overlaps a transmission resource of a physical uplink control channel PUCCH in time domain, and the PUCCH is used to carry to-be-transmitted uplink control information UCI. The sending module 403 is configured to: when a first condition is met, send uplink data on the PUSCH, and skip sending the UCI on the PUSCH. The first condition is the same as the first condition in step 13 in the uplink information transmission method.

In an optional design, the receiving module 401 is further configured to receive instruction information. The first condition is that the instruction information instructs not to carry the UCI on the PUSCH.

For specific implementations of the foregoing apparatus and modules of the apparatus, refer to implementations of steps performed by the terminal device in the uplink information transmission methods in FIG. 2 to FIG. 6.

It should be understood that in this embodiment of this application, module division is an example, and is merely logical function division. During actual implementation, there may be another division manner. In addition, function modules in each embodiment of this application may be integrated into one processor, or each of the modules may exist alone physically, or two or more modules may be integrated into one module. The integrated module may be implemented in a form of hardware, or may be implemented in a form of a software function module.

Figure 12:
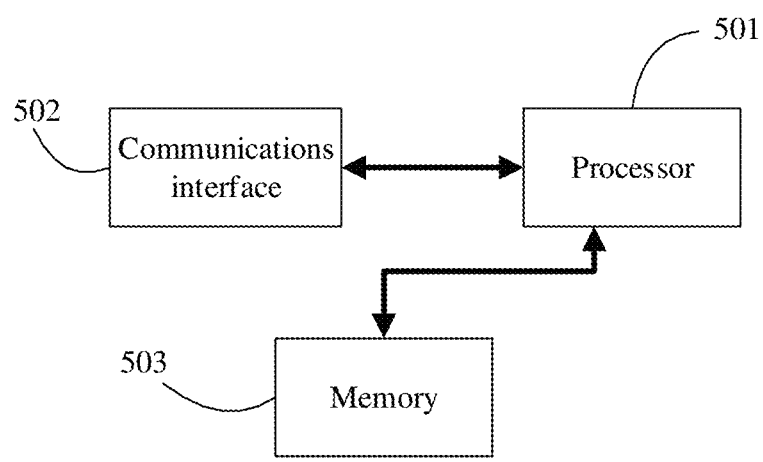
FIG. 12 is a schematic diagram of another communications apparatus according to an embodiment of this application.

When the integrated module is implemented in a form of hardware, referring to FIG. 12, the apparatus may include a processor 501. Physical hardware corresponding to the determining module may be the processor 501. The processor 501 may be a central processing module (CPU), a digital processing module, or the like. The apparatus may further include a communications interface 502, and physical hardware corresponding to the receiving module 401 and the sending module 403 may be the communications interface 502. The processor 501 receives, through the communications interface 502, DCI or other instruction information sent by the network device. The apparatus further includes a memory 503, configured to store a program executed by the processor 501. The memory 503 may be a non-volatile memory, for example, a hard disk (HDD), or a solid-state drive (SSD), or may be a volatile memory, for example, a random access memory (RAM). The memory 503 is any other medium that can carry or store expected program code in a form of an instruction or a data structure and that can be accessed by a computer, but is not limited thereto.

Figure 13:
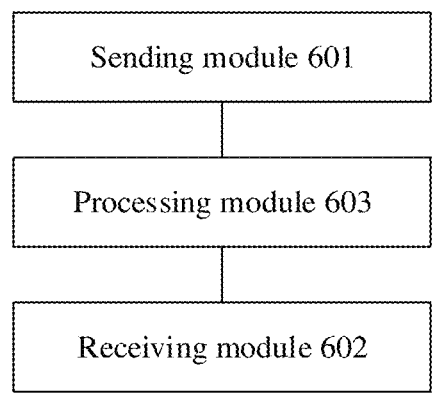
FIG. 13 is a schematic diagram of still another communications apparatus according to an embodiment of this application.

FIG. 13 shows a communications apparatus. The communications apparatus may be a network device, or may be a chip applied to a network device. The communications apparatus includes a sending module 601 and a receiving module 602. The sending module 601 is configured to send downlink control information DCI, where the DCI is used to schedule a physical uplink shared channel PUSCH, a transmission resource of the PUSCH overlaps a transmission resource of a PUCCH, and the PUCCH is used to carry to-be-transmitted uplink control information UCI. The receiving module 602 is configured to receive the PUSCH, where when a first condition is met, the downlink control information UCI carried by the PUCCH is not carried on the PUSCH. It should be understood that the network device may further include a processing module 603, configured to determine whether the first condition is met.

In an optional design, the sending module 601 is further configured to send instruction information. The first condition is that the instruction information instructs not to carry the UCI on the PUSCH.

For specific implementations of the foregoing network device and modules of the network device, refer to implementations of steps performed by the network device in the uplink information sending methods in FIG. 2 to FIG. 6.

Optionally, the communications apparatus may include a processor. Physical hardware corresponding to the processing module 603 may be the processor. The apparatus may further include a communications interface, and physical hardware corresponding to the sending module 601 and the receiving module 602 may be the communications interface. The processor receives, through the communications interface, uplink data sent by the terminal device. The communications interface is further configured to send DCI to the terminal device. The apparatus further includes a memory, configured to store a program executed by the processor.

An embodiment of this application provides an uplink information transmission apparatus. The apparatus is configured to perform the steps performed by the terminal device in the uplink information transmission method in step 21 to step 24 or step S1011 to step S1013. Specifically, the apparatus includes modules configured to perform the steps performed by the terminal device in the uplink information transmission method in step 21 to step 24 or step S1011 to step S1013.

Optionally, the uplink information transmission apparatus includes a memory, a processor, and a communications interface. The memory is configured to store a computer instruction. The communications interface is configured to communicate with another communications device or apparatus. The processor is connected to the memory and the communications interface, and is configured to execute the computer instruction, to perform the steps performed by the terminal device in the uplink information transmission method in step 21 to step 24 or step S1011 to step S1013.

An embodiment of this application provides an uplink information transmission apparatus. The apparatus is configured to perform the steps performed by the network device in the uplink information transmission method in step 21 to step 24 or step S101 to step S1013. Specifically, the apparatus includes modules configured to perform the steps performed by the network device in the uplink information transmission method in step 21 to step 24 or step S1011 to step S1013.

Optionally, the uplink information transmission apparatus includes a memory, a processor, and a communications interface. The memory is configured to store a computer instruction. The communications interface is configured to communicate with another communications device or apparatus. The processor is connected to the memory and the communications interface, and is configured to execute the computer instruction, to perform the steps performed by the network device in the uplink information transmission method in step 21 to step 24.

An embodiment of this application provides an uplink information transmission apparatus. The apparatus is configured to perform the steps performed by the terminal device in the uplink information transmission method in step 31 to step 36. Specifically, the apparatus includes modules configured to perform the steps performed by the terminal device in the uplink information transmission method in step 31 to step 36.

Optionally, the uplink information transmission apparatus includes a memory, a processor, and a communications interface. The memory is configured to store a computer instruction. The communications interface is configured to communicate with another communications device or apparatus. The processor is connected to the memory and the communications interface, and is configured to execute the computer instruction, to perform the steps performed by the terminal device in the uplink information transmission method in step 31 to step 36.

An embodiment of this application provides an uplink information transmission apparatus. The apparatus is configured to perform the steps performed by the network device in the uplink information transmission method in step 31 to step 36. Specifically, the apparatus includes modules configured to perform the steps performed by the network device in the uplink information transmission method in step 21 to step 24 or step 31 to step 36.

Optionally, the uplink information transmission apparatus includes a memory, a processor, and a communications interface. The memory is configured to store a computer instruction. The communications interface is configured to communicate with another communications device or apparatus. The processor is connected to the memory and the communications interface, and is configured to execute the computer instruction, to perform the steps performed by the network device in the uplink information transmission method in step 31 to step 36.

An embodiment of this application provides a computer-readable storage medium. The computer-readable storage medium stores a computer instruction. When the instruction is run on a computer, the computer is enabled to perform the uplink information transmission method in step 11 to step 14.

An embodiment of this application provides a computer-readable storage medium. The computer-readable storage medium stores a computer instruction. When the instruction is run on a computer, the computer is enabled to perform the uplink information transmission method in step 21 to step 24.

An embodiment of this application provides a computer-readable storage medium. The computer-readable storage medium stores a computer instruction. When the instruction is run on a computer, the computer is enabled to perform the uplink information transmission method in step 31 to step 36.

An embodiment of this application provides a computer program product. When the computer program product runs on a computer, the computer is enabled to perform the uplink information transmission method in step 11 to step 14.

An embodiment of this application provides a computer program product. When the computer program product runs on a computer, the computer is enabled to perform the uplink information transmission method in step 21 to step 24.

An embodiment of this application provides a computer program product. When the computer program product runs on a computer, the computer is enabled to perform the uplink information transmission method in step 31 to step 36.

An embodiment of this application provides a chip. The chip is configured to perform the uplink information transmission method in step 11 to step 14.

An embodiment of this application provides a chip. The chip is configured to perform the uplink information transmission method in step 21 to step 24.

An embodiment of this application provides a chip. The chip is configured to perform the uplink information transmission method in step 31 to step 36.

An embodiment of this application provides a computer-readable storage medium. The computer-readable storage medium stores a computer program or an instruction. When the computer program or the instruction is run, functions performed by the network device or the terminal device in step S1011 to step S1013 are implemented.

An embodiment of this application provides a computer program product. The computer program product includes a computer program or an instruction. When the computer program or the instruction is run, functions performed by the network device or the terminal device in step S1011 to step S1013 are implemented.

An embodiment of this application provides a chip. The chip includes a processing module and an interface circuit. The interface circuit is coupled to the processing module. The processing module is configured to execute a computer program or an instruction, to implement functions performed by the network device or the terminal device in step S1011 to step S1013. The interface circuit is configured to communicate with another module outside the chip.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of any other programmable data processing device to generate a machine, so that the instructions executed by the computer or the processor of any other programmable data processing device generate an apparatus for implementing a specific function in one or more processes in the flowcharts and/or in one or more blocks in the block diagrams. These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   receiving downlink control information (DCI);
   determining, based on the DCI, a transmission resource of a physical uplink shared channel (PUSCH) scheduled using the DCI, wherein the transmission resource of the PUSCH overlaps a transmission resource of a physical uplink control channel (PUCCH) in time domain, and the PUCCH is usable to carry to-be-transmitted uplink control information (UCI);
   determining whether a first condition is met, wherein the first condition comprises that that a payload size of the DCI is equal to a first value, and a search space of the DCI is a user equipment (UE)-specific search space, and wherein the first value is a payload size of fallback DCI; and
   when it is determined that the first condition is met, sending uplink data on the PUSCH, and disabling piggybacking the UCI on the PUSCH.

2. The method according to claim 1, wherein the first condition is that the payload size of the DCI is equal to the first value, a value of a DCI format identification field in the DCI is equal to a second value, and the search space of the DCI is the UE specific search space.

3. The method according to claim 1, wherein the transmission resource of the PUSCH completely overlaps the transmission resource of the PUCCH in time domain.

4. The method according to claim 1, wherein a time domain resource of the PUSCH partially overlaps a time domain resource of the PUCCH.

5. The method according to claim 1, wherein a time domain resource of the PUSCH includes all time domain resource of the PUCCH and includes additional time domain resources.

6. The method according to claim 1, wherein a time domain resource of the PUCCH includes all time domain resource of the PUSCH and includes additional time domain resources.

7. An apparatus, comprising:
a non-transitory memory; and
one or more processors coupled to the non-transitory memory, wherein the one or more processors are configured to:
receive downlink control information (DCI);
determine, based on the DCI, a transmission resource of a physical uplink shared channel (PUSCH) scheduled using the DCI, wherein the transmission resource of the PUSCH overlaps a transmission resource of a physical uplink control channel (PUCCH) in time domain, and the PUCCH is usable to carry to-be-transmitted uplink control information (UCI);
determine whether a first condition is met, wherein the first condition comprises that a value of a beta-offset indicated by a beta-offset indicator field indicates to disable piggybacking the UCI on the PUSCH; and
when the first condition is met, send uplink data on the PUSCH, and disable piggybacking the UCI on the PUSCH; and
wherein a time domain resource of the PUSCH includes all time domain resource of the PUCCH and includes additional time domain resources.

8. The apparatus according to claim 7, wherein the first condition is that:
the value of beta-offset indicated by the beta-offset indicator field in the DCI is 0.

9. The apparatus according to claim 7, wherein the first condition is that:
the value of the beta-offset indicator in the DCI is a fourth value, and the fourth value instructs not to send the UCI on the PUSCH.

10. An apparatus, comprising:
a non-transitory memory; and
one or more processors coupled to the non-transitory memory, wherein the one or more processors are configured to:
send downlink control information (DCI), wherein the DCI is usable to schedule a physical uplink shared channel (PUSCH), a transmission resource of the PUSCH overlaps a transmission resource of a physical uplink control channel (PUCCH) in time domain, and the PUCCH is usable to carry to-be-transmitted uplink control information (UCI);
determine, based on a transport block size (TBS) of uplink data to be carried on the PUSCH, whether a first condition is met; and
a receiver, configured to receive the uplink data carried on the PUSCH, wherein when the first condition is met, piggybacking the UCI on the PUSCH is disabled and the UCI is not carried on the PUSCH; and
wherein a time domain resource of the PUSCH includes all time domain resource of the PUCCH and includes additional time domain resources.

11. The apparatus according to claim 10, wherein the first condition is:
the TBS of uplink data carried on the PUSCH is less than or equal to a third threshold.

12. The apparatus according to claim 10, wherein the first condition is:
a ratio of a payload size of the UCI to the TBS of the uplink data is greater than or equal to a fourth threshold.

\* \* \* \* \*